United States Patent [19]
Wada et al.

[11] Patent Number: 5,104,764
[45] Date of Patent: Apr. 14, 1992

[54] PROCESS FOR PREPARATION OF POLYMER PARTICLES, PROCESS FOR PREPARATION OF TONER PARTICLES AND PARTICLES PREPARED ACCORDING TO THESE PROCESSES

[75] Inventors: Tomonori Wada, Kagoshima; Nobuhiro Hirano, both of Osaka; Hiroshi Shimoyama, Osaka; Hideki Ota, Ikoma; Toshiro Tokuno, Takarazuka, all of Japan

[73] Assignee: Mita Industrial Co., Ltd., Osaka, Japan

[21] Appl. No.: 443,578

[22] Filed: Nov. 30, 1989

[30] Foreign Application Priority Data

Nov. 30, 1988 [JP] Japan ................. 63-300862
Nov. 30, 1988 [JP] Japan ................. 63-300863
Jun. 21, 1989 [JP] Japan ................. 1-158826
Jul. 31, 1989 [JP] Japan ................. 1-198524

[51] Int. Cl.$^5$ ............ G03G 9/00; G03G 5/00; G03G 9/083
[52] U.S. Cl. ............. 430/109; 430/106.6; 430/111; 430/137
[58] Field of Search ............ 430/109, 137, 111, 138, 430/106.6

[56] References Cited

U.S. PATENT DOCUMENTS

| | | | |
|---|---|---|---|
| 4,507,378 | 3/1985 | Wada et al. | 430/137 |
| 4,521,508 | 6/1985 | Mori et al. | 525/309 |
| 4,816,366 | 3/1989 | Hyosu et al. | 430/109 |
| 4,849,318 | 6/1989 | Tsubota et al. | 430/137 |

Primary Examiner—Marion E. McCamish
Assistant Examiner—Stephen C. Crossan

[57] ABSTRACT

Disclosed a process for the preparation of polymer particles, which comprises suspending a polymerizable monomer, a radical initiator and a hardly soluble inorganic dispersant in a dispersion medium and carrying out polymerization in this state, wherein a hardly soluble inorganic dispersant, the solubility of which is changed according to the pH value in the dispersion medium and which is precipitated at a pH value within a certain pH value region of the dispersion medium, is used as the dispersant, suspension of the polymerizable monomer in the dispersion medium is carried out in the state where the dispersant is dissolved in the dispersion medium, an acid or base is then added to adjust the pH value of the dispersion medium to a predetermined level to precipitate the dispersant, and the polymerization is initiated in the state where oil drops having a fine particulate size are formed.

The process is effectively utilized for obtaining a toner having good flowability and blocking resistance and excellent developing and fixing properties by using a colorant together with the polymerizable monomer.

24 Claims, 2 Drawing Sheets

PROCESS FOR PREPARATION OF POLYMER PARTICLES, PROCESS FOR PREPARATION OF TONER PARTICLES AND PARTICLES PREPARED ACCORDING TO THESE PROCESSES

BACKGROUND OF THE INVENTION (1) Field of the Invention

The present invention relates to polymer particles. More particularly, the present invention relates to a process for the preparation of polymer particles in which the molecular weight of the interior is different from the molecular weight of the surface layer portion and which are used as extrusion molding resins, optical molding resins and other excellent products, and particles prepared according to this process.

Furthermore, the present invention relates to a process for the preparation of toner particles to be used for the electrophotography or electrostatic printing, and a toner comprising particles prepared according to this process. More particularly, the present invention relates to a toner formed by incorporating a colorant and the like into the above-mentioned polymer particles, which has a sharp particle size distribution, good flowability and blocking resistance, and excellent developing and fixing properties.

(2) Description of the Related Art

In polymer particles, the weight average molecular weight is substantially the same at any parts of particles. Namely, the polymer constituting the surface layer of particles has substantially the same average molecular weight as that of the polymer constituting the interior of particles, and the properties are not substantially different throughout the particles. However, particles having a sufficient adhesiveness on the surface but having an interior portion which does not melt, such as foamed styrol particles, and products having a high refractive index in the interior and a low refractive index in the surface portion, such as spherical lenses, are now required for high techniques. In case of low-molecular-weight particles such as extrusion molding resins, the surface has a high adhesiveness and particles are readily bonded to one another at the extrusion molding, and therefore, development of particles having no adhesiveness on the surface is desired.

However, most of conventional resins composed of polymer particles fail to sufficiently satisfy these requirements. Accordingly, with a view to providing functionally excellent polymer particles, we improved the suspension polymerization process in order to prepare polymer particles having different molecular weights in the interior portion and the surface layer portion.

In the suspension polymerization process, since the polymerization of a monomer is carried out in oil drops suspended and dispersed in an aqueous medium, the polymerization heat can be easily removed. By dint of this advantage, the suspension polymerization process is widely utilized on an industrial scale.

In this suspension polymerization process, however in order to stably suspend and disperse a monomer and the like into an aqueous medium, it is necessary to use surface active agents or various hardly soluble inorganic salts.

Accordingly, these surface active agents and the like are readily incorporated as impurities in the formed polymer and have bad influences on characteristics, such as electric properties, of the formed polymer.

The formed polymer is obtained in the particulate shape in the suspension polymerization process, and if it is intended to obtain particles having a small particle size, for example, a particle size smaller than 10 $\mu$m, it is necessary to increase the amount used of a dispersant such as a surface active agent, and therefore, emulsion polymerization particles having a particle size smaller than 1 $\mu$m are formed and they are incorporated as impurities in the formed polymer.

In the field of the electrophotography, a toner is used for visualizing an electrostatic image. Particles of this toner are composed of a composition formed by incorporating a colorant and, if necessary, a charge controlling agent and other additives in a resin medium, and the particle size is adjusted within a certain range, for example, from 1 to 30$\mu$m. A resin having desirable electroscopic and binding properties, for example, a styrene resin, is used as the resin medium, and carbon black or an organic or inorganic coloring pigment is used as the colorant.

As the process for the preparation of such a toner, there is known a process in which a toner is directly prepared at the polymerization step for preparing a toner resin.

In general, this preparation process comprises dissolving a water-insoluble monomer in a polymerization initiator soluble in the monomer, adding a colorant and other additive to the solution, suspending the resulting composition into an aqueous solution comprising a dispersant such as a water-soluble polymer, an inorganic powder and a surface active agent under high-speed shearing agitation and effecting polymerization to prepare colored polymer particles.

In this suspension polymerization process, the particle size of the final toner is determined by the suspension state of the monomer composition in water, and the particle size distribution is much broadened according to the state of charging of the monomer composition into water and the stirring state, and it is very difficult to obtain particles having a uniform particle size. Moreover, coarse particles having a particle size of scores of $\mu$m to several mm are generally formed in this suspension polymerization process, and it is difficult to obtain particles having a particle size of 1 to 30 $\mu$m valuable for a toner of a developer. Of course, it is possible to reduce the particle size of the formed polymer by increasing the amount incorporated of the dispersant. In this case, however, the dispersant is included in the toner, and the toner becomes sensitive to the moisture and the electrophotographic characteristics are readily degraded. A particular post treatment is necessary for eliminating this disadvantage, and the number of steps increases and the process is not practically applicable.

The most serious problem of the toner prepared by the suspension polymerization process resides in the unevenness of the particle size. Namely, incorporation of fine particles at a specific ratio cannot be avoided. These fine particles are composed solely of a polymer not containing toner additives such as the colorant and have characteristics different from those of the toner particles. Accordingly, even if these fine particles are incorporated in small amounts, scattering of the toner or fogging is caused at the development step and there is a risk of reduction of the flowability of the toner. Even if these fine particles can be removed, the composition of the obtained toner particles is greatly different from the initial composition, and the desirable characteristics cannot be obtained and the cost is increased by reduction of the yield.

Various proposals have been made on the process for preparing a toner having improved developing and fixing properties by the suspension polymerization. For example, Japanese Examined Patent Publication No. 64-11941 discloses a process in which a plurality of initiators differing in the half-value period are contained in a polymerizable monomer and the polymerization is carried out in this state. In this process, however, if an initiator having a long half-value period is used to broaden the molecular weight distribution, the time required for the polymerization is long, and the period during which oil drop particles are dispersed in the highly viscous state at the polymerization becomes long and coalescence of particles is readily caused, with the result that the formed toner contains coarse particles and the particle size distribution is broadened. The so-obtained toner shows certain effects in connection with the fixing property and offset resistance, but the durability and blocking resistance are poor, presumably because of the presence of the low-molecular-weight component on the surfaces of the formed polymer particles. Accordingly, further improvements are desired.

SUMMARY OF THE INVENTION

It is a primary object of the present invention to provide a process for preparing particles formed of a polymer by the suspension polymerization without bad influences by a dispersion stabilizer or surface active agent and a process for preparing polymer particles having a sharp particle size distribution without formation of fine particles. According to this process for preparing such polymer particles, in principle, a polymerizable monomer, a radical initiator and a hardly soluble inorganic dispersant are suspended in a dispersion medium and polymerization is carried out in this state. Namely, the preparation process is characterized in that a hardly soluble dispersant, the solubility of which is changed according to the pH value in the dispersion medium and which is precipitated at a pH value within a certain pH value region of the dispersion medium, is used as the dispersant, suspension of the polymerizable monomer in the dispersant is carried out in the state where the dispersant is dissolved in the dispersion medium, an acid or base is then added to adjust the pH value of the dispersion medium to a predetermined level to precipitate the dispersant, and the polymerization is initiated in the state where oil drops having a fine particulate size are formed.

Another object of the present invention is to provide a process for the preparation of functional polymer particles having a surface layer portion having a high adhesiveness and an interior portion which hardly melts, and particles prepared according to this process. According to this process the preparation of functional polymer particles is carried out based on the suspension polymerization, and the preparation process is characterized in that a polymerizable monomer, a radical initiator and a hardly soluble inorganic dispersant are suspended in a dispersion medium, the polymerization is carried out, when the polymerization ratio reaches 20 to 80%, a base is added to increase the pH value of the dispersion medium, and the polymerization is completed. In polymer particles obtained according to this process, the molecular weight is gradually decreased toward the surface layer portion from the interior, the weight average molecular weight (Mw) of the polymer is 5,000 to 700,000, and the weight average molecular weight (Mw)/number average molecular weight (Mn) ratio is in the range of from 5 to 50.

Still another object of the present invention is to provide a process for the preparation of functional polymer particles in which the surface layer portion has an excellent melting resistance and the interior portion has an easy meltability and particles prepared according to this process. According to this process, the preparation of such functional polymer particles is carried out based on the suspension polymerization, and the preparation process is characterized in that a polymerizable monomer, a radical initiator and a hardly soluble inorganic dispersant is suspended in a dispersion medium, the polymerization is carried out, when the polymerization ratio reaches 20 to 80%, an acid is added to reduce the pH value, and the polymerization is completed. In polymer particles prepared according to this process, the molecular weight is gradually increased toward the surface layer portion from the interior, the weight average molecular weight (Mw) of the polymer is 5,000 to 700,000, and the weight average molecular weight (Mw)/number average molecular weight (Mn) ratio is in the range of from 5 to 50.

In this process for the preparation of functional polymers, the particle size distribution in particles can be sharpened by using the dispersant mentioned above with respect to the first preparation process.

According to the present invention, processes for preparing excellent toners used in the electrophotography by utilizing the above-mentioned processes for the preparation of polymer particles are provided.

Namely, a further object of the present invention is to provide a toner composed of a particulate polymer in which bad influences of a dispersant or surface active agent are not manifested and a process for preparing a toner composed of particles having a sharp particle size distribution, in which scattering of the toner or reduction of the flowability is not caused. According to this process, the preparation is carried out based on the suspension polymerization, and the process is characterized in that a polymerizable monomer, a colorant, a dispersant, the solubility of which is changed according to the pH value in a dispersion medium and which is precipitated at least at a predetermined pH value, and a radical polymerization initiator are suspended and dispersed in said dispersion medium, an acid or alkali is then added to adjust the pH value to said predetermined level to precipitate the dispersant, and the polymerization is carried out in the state where oil drops having a fine particulate size are formed. The toner prepared according to this process is composed of colorant-containing polymer particles and is characterized in that the particles have such a particle size distribution that the median diameter of the particles based on the volume is in the range of from 5 to 20 μm and the ratio of the 25% cumulative diameter (D25) based on the volume to the 75% cumulative diameter (D75) based on the volume is in the range of from 1.4 to 1.7.

A further object of the present invention is to provide a process for the preparation of toner particles excellent in the flowability in an apparatus, the fixing property to a copying paper or the like, the durability and the blocking resistance, and a toner composed of toner particles prepared according to this process. Such toner particles are prepared by a suspension polymerization process characterized in that a polymerizable monomer, a radical polymerization initiator, a colorant and a hardly soluble dispersant are suspended in a dispersion medium, the polymerization is carried out, the pH value of the dispersion medium is reduced in the midway of the polymerization, and the polymerization is further carried out. Toner particles prepared according to this process are characterized in that the molecular weight is gradually decreased toward the surface layer portion from the interior, the weight average molecular weight (Mw) of the polymer particles is 5,000 to 700,000, and the weight average molecular weight (Mw)/number average molecular weight (Mn) ratio is in the range of from 5 to 50.

A further object of the present invention is to provide a toner composed of particles having a uniform particle size, in which the molecular weight is gradually decreased toward the surface layer portion from the interior, said toner having improved flowability and excellent fixing property and durability and not causing scattering of the toner, and a process for the preparation of this toner. This preparation process is based on the suspension polymerization and is characterized in that a polymerizable monomer, a colorant, a dispersant, the solubility of which is changed according to the pH value of a dispersion medium and which is precipitated in the dispersion medium at a predetermined pH value of the dispersion medium, and a radical polymerization initiator are incorporated in said dispersion medium, an acid or alkali is added to adjust the pH value of the dispersion medium to the predetermined level and form oil drops having a fine particulate size, the pH value of the dispersion medium is reduced in the midway of the polymerization, and the polymerization is further carried out. The toner prepared according to this process is characterized in that in the toner particles, the molecular weight is decreased toward the surface layer portion from the interior, the weight average molecular weight (Mw) of the polymer particles is 5,000 to 700,000, the weight average molecular weight (Mw)/number average molecular weight (Mn) ratio is in the range of from 5 to 50, and the particles have such a sharp particle size distribution that the median diameter of the particles based on the volume is 5 to 20 um and the ratio of the 25% cumulative diameter (D25) to the 75% cumulative diameter (D75) based on the volume is in the range of from 1.4 to 1.7.

Incidentally, the cumulative diameter based on the volume preferred to in the present invention is determined in the following manner. The diameters of particles are measured by a Coulter counter, and the measured values of the particle diameters are cumulated in the order of the diameter magnitude. The diameter of the particle cumulated when the volume of the cumulated particles reaches 25% based on the total volume is designated as the 25% cumulative diameter (D25) based on the volume, and the diameter of the particle cumulated when the volume of the cumulated particles reaches 75% of the total volume is designated as the 75% cumulative diameter (D75) based on the volume.

DETAILED DESCRIPTION OF THE INVENTION

Figure 1:
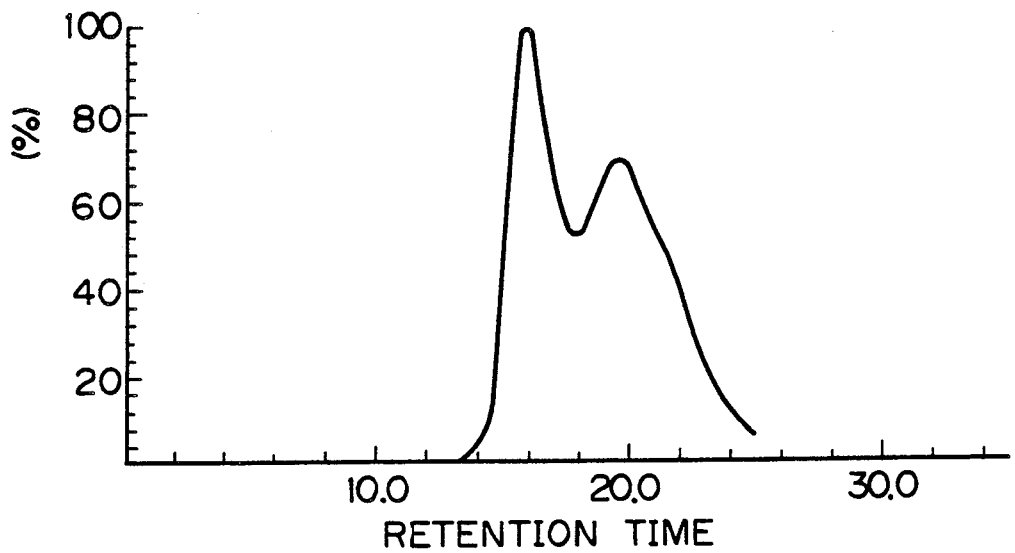
FIG. 1 is a curve showing the molecular weight distribution, determined by GPC, of the toner obtained in Example 13.

(1) Process for Preparation of Polymer Particles Having Uniform Particle Size In the suspension polymerization process, a monomer is dispersed and suspended in water by a suspension dispersion stabilizer, and the polymerization is carried out in the presence of a radical polymerization initiator dissolved in the monomer.

It is known that a hardly soluble inorganic powder such as tricalcium phosphate is used as the suspension dispersion stabilizer.

However, this hardly soluble inorganic powder is not completely satisfactory in the suspension stability, and formed resin particles are coarse and have a large particle size, and the particle size distribution is very broad.

On the other hand, a surface active agent is excellent in the suspension stability but the tendency to emulsify a part of the monomer cannot be avoided and incorporation of fine emulsion polymerization particles into the suspension polymerization particles cannot be avoided.

In the present invention, a hardly soluble dispersant, the solubility of which is changed according to th pH value of a dispersion medium and which is precipitated at a pH value within a certain pH value region of the dispersion medium, is used. Tricalcium phosphate [Ca$_3$(PO$_4$)$_2$] can be used as the hardly soluble dispersant. The process is characterized in that this tricalcium phosphate is dissolved in advance in an aqueous solution of an acid, the monomer and other additives are suspended and dispersed in the solution, and the polymerization is carried out in the state where tricalcium phosphate is precipitated.

In the case where tricalcium phosphate is mixed with the monomer and other additives, the mixture is suspended and dispersed and the polymerization is carried out, since suspended and dispersed particles per se are coarse, formed resin particles have a large particle size and a very broad particle size distribution.

According to the present invention, tricalcium phosphate is dissolved in advance, and after the monomer and other components are suspended and dispersed in the solution, the tricalcium phosphate is precipitated. Accordingly, the tricalcium phosphate finely precipitated around the dispersed oil drops is uniformly distributed and agglomeration of the oil drops or coarsening thereof is effectively prevented and oil drops having a fine particulate size are effectively maintained, with the result that polymer particles having a fine particle size and a sharp particle size distribution can be obtained.

Starting Materials

(a) Radical-Polymerizable Monomer

In the suspension polymerization process of the present invention, at least one member selected from monomers having an ethylenically unsaturated bond is used as the radical-polymerizable monomer.

As preferred examples of the monomer, there can be mentioned monovinyl aromatic monomers, acrylic monomers, vinyl ester monomers, vinyl ether monomers, diolefin monomers and mono-olefin monomers.

As the monovinyl aromatic monomer, there can be mentioned monovinyl aromatic hydrocarbons represented by the following formula:

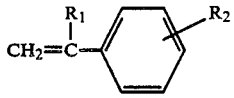

wherein $R_1$ represents a hydrogen atom, a lower alkyl group or a halogen atom, and $R_2$ represents a hydrogen atom, a lower alkyl group, a halogen atom, an alkoxy group, an amino group, a nitro group, a vinyl group or a carboxyl group.

For example, at least one member selected from styrene, α-methylstyrene, vinyltoluene, α-chlorostyrene, o-, m- and p-chlorostyrenes, p-ethylstyrene, sodium styrene-sulfonate and divinylbenzene can be used.

As other monomers that can be used in the present invention, there can be mentioned acrylic monomers represented by the following formula:

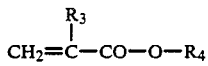

wherein $R_3$ represents a hydrogen atom or a lower alkyl group, and $R_4$ represents a hydrocarbon group having up to 12 carbon atoms, a hydroxyalkyl group, a vinyl ester group or an aminoalkyl group, such as acrylic acid, methacrylic acid, methyl acrylate, ethyl acrylate, butyl acrylate, 2-ethylhexyl acrylate, cyclohexyl acrylate, phenyl acrylate, methyl methacrylate, hexyl methacrylate, 2-ethylhexyl methacrylate, ethyl β-hydroxyacrylate, propyl γ-hydroxyacrylate, butyl δ-hydroxyacrylate, ethyl β-hydroxymethacrylate, propyl γ-aminoacrylate, propyl γ-N,N-diethylaminoacrylate, ethylene glycol dimethacrylate and tetraethylene glycol dimethacrylate, vinyl esters represented by the following formula:

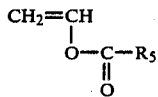

wherein $R_5$ represents a hydrogen atom or a lower alkyl group, such as vinyl formate, vinyl acetate and vinyl propionate, vinyl ethers represented by the following formula:

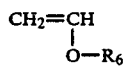

wherein $R_6$ represents a monovalent hydrocarbon group having up to 12 carbon atoms, such as vinyl methyl ether, vinyl ethyl ether, vinyl n-butyl ether, vinyl phenyl ether and vinyl cyclohexyl ether, diolefins represented by the following formula:

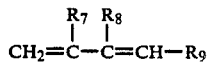

wherein $R_7$, $R_8$ and $R_9$ represent a hydrogen atom, a lower alkyl group and a halogen atom, such as butadiene, isoprene and chloroprene, and monoolefins represented by the following formula:

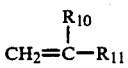

wherein $R_{10}$ and $R_{11}$ represent a hydrogen atom or a lower alkyl group, such as ethylene, propylene, isobutylene, butene-1, pentene-1 and 4-methylpentene-1.

In the present invention, in order to promote the stabilization of dispersed oil drops, it is preferred that the polarity of the polymerizable composition be controlled according to the polarity of the hardly soluble inorganic dispersant. For example, there can be mentioned a method in which an ethylenically unsaturated monomer having an anionic group or a cationic group is incorporated or is built in a polymer chain, or a method in which an unpolymerizable organic compound having an anionic group or a cationic group is incorporated. As preferred examples, there can be mentioned ionic monomers such as acrylic acid, methacrylic acid, maleic acid anhydride, fumaric acid, itaconic acid anhydride, crotonic acid, tetrahydrophthalic acid anhydride, styrene-sulfonic acid and 2-acrylamido-2-methylpropane-sulfonic acid, cationic monomers such as dimethylaminoethyl (meth)acrylate, diethylaminoethyl (meth)acrylate, diethylaminopropyl (meth)acrylate, N-aminoethylaminopropyl (meth)acrylate, vinylpyridine, 2-vinylimidazole and 2-hydroxy-3-acryloxypropyltrimethyl ammonium chloride, anionic organic compounds such as homopolymers and copolymers containing an anionic monomer as mentioned above in the polymer chain, monoazo dye metal complexes and complexes of hydroxycarboxylic acids with metals such as salicylic acid and naphthoic acid, and cationic organic compounds such as homopolymers and copolymers having a cationic monomer as mentioned above in the polymer chain, oil-soluble dyes, for example, Nigrosine Base (CI 5045), Oil Black (CI 26150) and Spilon Black, primary, secondary and tertiary amines and quaternary ammonium salts.

From the viewpoint of the adhesiveness, it is preferred that the main component of the polymerizable monomer be at least one member selected from the group consisting of styrene, acrylic acid esters and methacrylic acid esters, and a cationic or anionic group-containing monomer be obtained at a concentration of 0.1 to 20% by weight, especially 0.5 to 10% by weight, based on the monomer composition.

(b) Polymerization Inhibitor

As the polymerization initiator, there can be used radical polymerization initiators, for example, azo compounds such as 2,2-azobis(2,4-dimethylvaleronitrile), 2,2'-azobisisobutyronitrile, 1,1'-azobis(cyclohexane-1-carbonitrile) and 2,2'-azobis-4-methoxy-2,4-dimethylvaleronitrile, and organic peroxides such as cumene hydroperoxide, t-butyl hydroperoxides, dicumyl peroxide, di-t-butyl peroxide, benzoyl peroxide and lauroyl peroxide. These radical polymerization initiators can be used in combination with ionizing radiations such as γ-rays and accelerated electron beams.

The amount incorporated of the polymerization initiator such as an azo compound or a peroxide can be a so-called catalytic amount, and it is generally preferred that the polymerization initiator be used in an amount of 0.1 to 10% by weight based on the charged monomer.

(c) Dispersion Stabilizer

In the present invention, a hardly soluble inorganic dispersant is used as the diapersant. For example, powders of inorganic salts such as calcium sulfate, tricalcium phosphate, magnesium carbonate, barium carbonate, calcium carbonate and aluminum hydroxides can be used. The inorganic dispersant is used in an amount of 0.5 to 20 parts by weight, preferably 1 to 10 parts by weight, per 100 parts by weight of water.

(d) Other Additives

In the present invention, in addition to the above-mentioned radical-polymerizable monomer (a) and radical polymerization initiator (b), a crosslinking agent or a chain transfer agent can be used for adjusting the molecular weight, if necessary.

As the crosslinking agent, there can be used any of known crosslinking agents, for example, divinyl compounds such as divinylbenzene, divinyl ether and divinylsulfone, diallyl compounds such as allyl phthalate and diallyl carbinol, and diacryl esters such as diacryl phenol. Diacryl esters are especially preferably used.

As the chain transfer agent, there can be mentioned alkylmercaptans such as butylmercaptan and dodecylmercaptan, lower alkyl xanthogenates such as diisopropyl xanthogenate, and halogenated hydrocarbons such as carbon tetrachloride and carbon tetrabromide.

Dispersant-Dissolving Step

The dispersant is used in a specific pH value region determined according to the dispersant used. For example, a phosphoric acid salt is soluble in an acidic condition and insoluble in an alkaline condition. In the case where tricalcium phosphate [$Ca_3(PO_4)_2$] is used as the dispersant, tricalcium phosphate is added into an aqueous solution of an acid to dissolve tricalcium phosphate.

A mineral acid such as hydrochloric acid, sulfuric acid or nitric acid can be used as the acid, and hydrochloric acid is especially preferably used.

For example, when hydrochloric acid is used as the acid, the reaction is represented by the following formula:

$$Ca_3(PO_4)_2 + 6HCl \rightarrow 3CaCl_2 + 2H_3PO_4$$

Tricalcium phosphate is an inorganic powder, and since tricalcium phosphate is dissolved in an aqueous solution of an acid in the present invention, the particle size or the like of the used tricalcium phosphate is not particularly critical.

Dissolution of tricalcium phosphate can also be accomplished by dispersing tricalcium phosphate in water and adding an acid or an aqueous solution of an acid to the dispersion.

The mineral acid is used in such an amount that all of the used tricalcium phosphate is completely dissolved.

Instead of the method in which the dispersant is dissolved, there can be adopted a method in which substances that can be precipitated as a dispersant at a specific pH value, such as calcium chloride and phosphoric acid, are dissolved in advance.

Suspending-Dispersing Step

The radical-polymerizable monomer and the radical polymerization initiator are suspended and dispersed in the solution of the dispersant such as tricalcium phosphate.

Other additives such as the crosslinking agent and chain transfer agent can be added at this step, if necessary.

The charged amount of the monomer is 5 to 20 parts by weight, especially 10 to 100 parts by weight, per 100 parts by weight of the aqueous solution of the acid containing tricalcium phosphate dissolved therein. The amount incorporated of the radical initiator can be a so-called catalytic amount and in general, the amount of the radical initiator is 0.1 to 10% by weight based on the charged monomer.

In the present invention, it is preferred that a surface active agent be added to the aqueous solution of the acid before the addition of the monomer and other components. The surface active agent acts as a dispersion stabilizer at the oil drop-forming step described hereinafter.

An anionic surface active agent is advantageously used as the surface active agent. Preferable examples include fatty acid salts such as sodium oleate and a potassium soap of castor oil, higher alcohol sulfate salts such as sodium lauryl sulfate and sodium cetyl sulfate, alkylaryl sulfonate salts such as sodium dodecyl benzene-sulfonate, a sodium alkyl naphthalene-sulfonate and a sodium salt of a $\beta$-naphthalene-sulfonic acid/formalin condensate, naphthalene-sulfonic acid salt derivatives, dialkyl sulfosuccinate salts, dialkyl phosphate salts, polyoxyethylene alkyl ether sulfate salts, polyoxyethylene alkyl ether sulfate salts, polyoxyethylene alkyl ether sulfate triethanolamines and polyoxyethylene alkyl phenol ether sulfate salts.

Use of a small amount of the surface active agent is sufficient. For example, the surface active agent is used in an amount of up to 0.5 part by weight, preferably up to 0.1 part by weight, per 100 parts by weight of water.

Oil Drop-Forming Step

In the present invention, then, a base such as LiOH, KOH or NaOH is added with stirring.

By the addition of the base, calcium triphosphate is precipitated to form very fine suspended oil drops.

The tricalcium triphosphate-precipitating reaction is represented by the following formula: $3CaCl_2 + 2H_3PO_4 + 6NaOH \rightarrow Ca_3(PO_4)_2 \downarrow + 6NaCl + 6H_2O$

Polymerization Step

The radical polymerization reaction is carried out in the state where the fine suspended oil drops are formed.

The polymerization temperature and time may be those adopted in the conventional techniques. In general, it is sufficient if the polymerization is carried out at a temperature of 40° to 100° C. for 1 to 50 hours. The stirring of the reaction mixture may be such gentle stirring as to cause a homogeneous reaction in the entire reaction mixture. In order to prevent inhibition of the polymerization by oxygen, the polymerization can be carried out while replacing the atmosphere of the reaction system by an inert gas such as nitrogen.

By the reaction, the polymerization product is obtained in the particulate form having a particle size smaller than 30 μm, especially 1 to 10 μm. The formed particles are recovered by filtration, washed with water if necessary, and dried to obtain a particulate polymer.

According to the above-mentioned process of the present invention, polymer particles having a fine particle size and a sharp particle size distribution can be obtained.

According to the polymerization process of the present invention, by adjusting the concentration of the inorganic salt dissolved in the reaction mixture or the pH value, the molecular weight of the polymer can be adjusted without changing the quantities of the radical polymerization initiator, the crosslinking agent or the chain transfer agent.

For example, at the above-mentioned tricalcium phosphate-dissolving step or oil drop-forming step, the concentration of the aqueous solution of the acid or the amount added of the base is controlled to appropriately adjust the concentration of the calcium salt dissolved in the reaction mixture, whereby the molecular weight of the obtained polymer can be changed according to the calcium concentration.

As is apparent from the comparison of Example 2 with Examples 3, 4, 5, 6 and 7, in the case where the amount used of the acid or base is large, that is, the concentration of the inorganic salt dissolved in the reaction mixture is low, even if the pH value is the same, the molecular weight of the obtained polymer is high.

Furthermore, as is apparent from the comparison of Examples 2, 4 and 6 with Examples 3, 5 and 7, if the amount of the base to a certain amount of the acid is large, that is, the pH value of the reaction mixture for the polymerization is high, the molecular weight of the obtained polymer is low.

As is apparent from the foregoing description, the molecular weight of the polymer can be adjusted only by adjusting the amounts used of the acid and base without adjusting the quantities of the components to be subjected to the polymerization.

In the present invention, if the amount added of the base is adjusted so that the pH value of the reaction mixture is 7 to 8, by reducing the amount used of the surface active agent, polymer particles having a volume average particle size smaller than 10 $\mu$m can be obtained, and furthermore, the reaction efficiency of the polymerization is increased and the amount of the unreacted residual monomer can be drastically reduced.

If the amount added of the base is adjusted so that the pH value of the reaction mixture is larger than 11, the obtained polymer particles have a very sharp particle size distribution, that is, a uniform particle size.

The obtained particles can be utilized as a gap-adjusting agent for a liquid crystal display board, a filler for a column for the chromatography or the like and a filler for cosmetics.

The suspension polymerization process of the present invention can be advantageously applied to the production of a toner for the electrophotography, for example, by using a colorant together with the monomer component.

(2) Process for Preparation of Polymer Particles Having Molecular Weight Gradient from Interior to Surface Layer Portion, and Particles Obtained by This Process This process of the present invention is characterized in that a hardly soluble inorganic dispersant is used as a dispersant in an aqueous medium, the dispersion is kept alkaline at the suspended oil-forming step and the initial stage of the polymerization reaction, the pH value of the dispersion is reduced when the polymerization reaction is advanced to some extent, and the polymerization is further conducted.

We made various experiments and investigations, and as a result, it was found that the pH value of a dispersion containing a hardly soluble inorganic dispersant has certain influences on the oil drop-forming property at the suspension granulation step and the polymerization degree at the polymerization reaction. Namely, it was found that if the suspension dispersion is carried out in a strongly alkaline state, the stability of particles is improved and coalescence of the particles is hardly caused, and particles having a particle size corresponding to the stirring speed and a sharp particle size distribution can be obtained. It also was found that if the polymerization reaction is advanced while keeping the dispersion in a strongly alkaline state, a polymer having a low polymerization degree is mainly formed and if the polymerization is carried out in a neutral or acidic state, a polymer having a high polymerization degree is mainly obtained. We have now completed the present invention based on these findings.

More specifically, according to the present invention, a polymerizable monomer is suspension-polymerized while maintaining the pH value of the dispersion medium at a relatively low level (a pH value within the alkaline range can be adopted), and when the polymerization degree reaches 20 to 80%, especially 30 to 70%, the pH value of the dispersion is increased and the remainder of the monomer component is polymerized to form a polymer component having a low molecular weight. In the obtained particles, the molecular weight is gradually decreased to the surface layer portion from the interior, and functional polymer particles in which the refractive index and meltability are different between the interior and the surface layer portion are obtained. Namely, at the initial stage of the polymerization where the pH value of the dispersion is small, a polymer having a high molecular weight is obtained, and when the polymerization degree reaches 20 to 80%, the viscosity is increased in the interior of oil drops and diffusion of oil drops is controlled. If the base is then added at a time, intermittently or continuously to increase the pH value, a polymer having a low molecular weight is formed in the surface layer portion of particles. Thus, polymer particles having the above-mentioned molecular weight gradient are obtained.

The starting materials used in this process are substantially the same as mentioned above with respect to process (1). Accordingly, the detailed description is omitted. As the hardly soluble inorganic dispersant, there can be used silica, calcium sulfate, barium carbonate, and aluminum hydroxide.

Suspending-Dispersing Step and Oil Drop-Forming Step

In the present invention, the above-mentioned hardly soluble inorganic dispersant is added into water, and the mixture is stirred to disperse the inorganic dispersant. Then, the above-mentioned polymerizable composition is added into the dispersion and the suspension granulation is carried out by a high-speed shearing stirrer such as a homomixer or homogenizer to form oil drops. It is generally preferred that the stirring speed be 100 to 30,000 rpm, whereby the size of the formed drops is adjusted to several $\mu$m to several mm.

At the oil drop-forming step, in order to enhance the dispersion stabilizing effect, a small amount of a surface active agent can be used together with the hardly soluble inorganic dispersant. As the anionic surface active agent, there can be mentioned fatty acid salts such as sodium oleate, higher alcohol sulfate salts such as sodium lauryl sulfate and alkyl aryl sulfonate salts such as sodium dodecyl benzenesulfonate. Known water-soluble surface active agents can be used in combination with the inorganic dispersant. The surface active agent is used in an amount of up to 0.5% by weight, preferably up to 0.1% by weight.

Polymerization Step

The radical polymerization is carried out in the state where the above-mentioned oil drops are formed. The polymerization temperature and time can be those adopted in the conventional techniques. The polymerization is generally carried out at 40° to 100° C., preferably 60° to 90° C., for 1 to 13 hours. The stirring of the reaction mixture may be such gentle stirring as causing uniform reaction in the entire reaction mixture. Furthermore, in order to prevent inhibition of the polymerization by oxygen, the polymerization can be carried out while replacing the atmosphere of the reaction system by an inert gas such an nitrogen.

The reaction time depends on the monomer used, the polymerization initiator used and the reaction time. In general, the polymerization is conducted until the polymerization ratio is 20 to 80%. For example, in the case where the polymerization is carried out at 70° to 80° C. by using a polymerization initiator having a half-value period of 30 to 500 minutes as measured at 70° C. in an amount of 1.5 to 5 parts by weight per 100 parts by weight of the polymerizable monomer, it is preferred that the polymerization be conducted for about 0.5 to about 10 hours. The weight average molecular weight of the polymer formed by the reaction is 10,000 to 1,000,000, especially 5,000 to 300,000. When the polymerization ratio reaches the above-mentioned level, the base is dropped and added and the pH value of the dispersion is elevated to at least 11, preferably at least 12, especially preferably at least 13. It is preferred that the rate of addition of the base, for example, sodium hydroxide be 0.00001 to 0.1 g/cc.min, especially 0.00005 to 0.01 g/cc.min, at the normality of 4N.

After the pH value has been thus elevated, the polymerization is conducted until the reaction is completed. Thus, a polymer as the low-molecular-weight component, which has a weight average molecular weight of 5,000 to 500,000, preferably 8,000 to 100,000, is formed. The polymer particles obtained after completion of the polymerization reaction are polymer particles having an Mw/Mn ratio of from 7 to 30, preferably from 10 to 20, and being composed of a low-molecular-weight component and a high-molecular-weight component, and these polymer particles are excellent in the adhesiveness and optical characteristics.

In the present invention, in order to sharpen the particle size distribution and avoid influences of the dispersion stabilizer, the suspending-dispersing step and oil drop-forming step adopted in the above-mentioned preparation process (1) can be adopted. More specifically, a hardly soluble dispersant, the solubility of which is changed according to the pH value of the dispersion medium and which is precipitated at a predetermined pH value within a certain pH value region of the dispersion medium, is used, and the polymerizable monomer is suspended in the dispersion medium in the state where the dispersant is dissolved, and then, an acid or base is added to adjust the pH value of the dispersion medium to the predetermined level and form oil drops having a fine particulate size.

(3) Process for Preparation of Polymer Particles Having Molecular Weight Gradient toward Interior from Surface Layer Portion, and Particles Obtained by This Process This process is based on the finding that as in the above-mentioned process (2), if the polymerization reaction is advanced while keeping the dispersion in a strongly alkaline state, a polymer having a low polymerization degree is mainly formed and if the polymerization reaction is advanced in a neutral or acidic state, a polymer having a high polymerization degree is mainly formed.

More specifically, according to this process of the present invention, a polymerizable monomer is suspension-polymerized in a dispersion having a relatively large pH value, and when the polymerization ratio reaches 20 to 80%, especially 40 to 60%, the pH value of the dispersion is reduced and the remainder of the monomer is polymerized to form a high-molecular-weight polymer component. In the obtained polymer particles, the molecular weight is gradually reduced to the interior from the surface layer portion, and functional polymer particles in which the refractive index and meltability are different between the interior and the surface layer portion are obtained. More specifically, a polymer having a low molecular weight is formed at the initial stage of the polymerization because the pH value of the dispersion is large, and when the polymerization ratio reaches 20 to 80%, the viscosity is increased in the interior of oil drops and diffusion of oil drops is controlled. In this state, an acid is added at a time, intermittently or continuously to reduce the pH value, whereby a polymer having a high molecular weight is formed in the surface layer portion of the particles and polymer particles having a molecular weight gradient are formed.

The starting materials used in the present process are substantially the same as those used in the above-mentioned processes (1) and (2). Accordingly, the detailed description is omitted.

The suspending-dispersing step and oil drop-forming step of this process are substantially the same as those of the above-mentioned process (2) except that the pH value of the dispersion is increased at the initial stage. If the dispersion medium is kept in a strongly alkaline state, for example, at a pH value larger than 11, at the initial stage, the stability of suspended particles is improved and coalescence of particles is hardly caused, and particles having a particle size corresponding to the stirring speed and a sharp particle size distribution can be obtained. The oil drop-forming step adopted in the process (1) can be adopted in the present process as well as in the process (2). The particle size of particles can be uniformalized in the present process.

Polymerization Step

The radical polymerization is carried out in the state where the oil drops are thus formed. Known polymerization temperature and time can be adopted. Generally, the polymerization is carried out at a temperature of 40° to 100° C., preferably 60° to 90° C., for 1 to 13 hours. The stirring of the reaction mixture may be such gentle stirring as causing uniform reaction in the entire mixture, and in order to prevent inhibition of the polymerization by oxygen, the atmosphere of the reaction system can be replaced by an inert gas such as nitrogen.

Preferably, the pH value of the dispersion is maintained at a level higher than 11 at the start of the reaction. By this polymerization, a low-molecular-weight polymer component having a low polymerization degree is formed. The reaction time depends on the used monomer, the used polymerization initiator and the reaction temperature, but the reaction is generally carried out until the polymerization ratio is 20 to 80%. For example, in the case where the polymerization is carried out at 70° to 80° C. by using a polymerization initiator having a half-value period of 30 to 500 minutes as measured at 70° C. in an amount of 1.5 to 5 parts by weight per 100 parts by weight of the polymerizable monomer, the reaction is preferably conducted for about 0.5 to about 10 hours after the start of the polymerization. The weight average molecular weight of the polymer formed by the reaction is 5,000 to 500,000, especially 8,000 to 100,000. When the polymerization ratio reaches the above-mentioned level, an acid is added and dropped into the dispersion to adjust the pH value of the dispersion to a level lower than 11, preferably 7 to 10, especially preferably 7 to 8. The dropping rate of the acid is generally 0.0001 to 0.01 g/cc min, preferably 0.0005 to 0.01 g/cc min, to the dispersion. If the dropping rate is too high, the acid does not permeate uniformly in the dispersion, and therefore, a heterogeneous portion is formed in the reaction mixture and no good results can be obtained. After the pH value has been thus adjusted, the polymerization is conducted until the reaction is completed. By this reaction, a high-molecular-weight polymer having a high polymerization degree, that is, a weight average molecular weight of 10,000 to 1,000,000, preferably 5,000 to 300,000, is formed. In the polymer particles obtained after completion of the polymerization reaction, the Mw/Mn ratio is 7 to 30, preferably 10 to 20, and the polymer particles are composed of a low-molecular-weight component and a high-molecular-weight component and are excellent in the adhesiveness and bleaking resistance.

Processes for preparing excellent toners to be used in the electrophotography by utilizing the above-mentioned processes for preparing polymer particles will now be described in detail.

(4) Process for Preparation of Toner Having Uniform Toner Particle Size

This process is carried out according to the suspension polymerization procedures. Namely, a polymerizable monomer, a colorant, a dispersant, the solubility of which is changed according to the pH value of a dispersion medium and which is precipitated at a predetermined pH value in the dispersion medium, and a radical polymerization initiator are suspended and dispersed in the dispersion medium, an acid or base is added to adjust the pH value of the dispersion to the predetermined level and form oil drops having a fine particulate size, and the polymerization is carried out in the state where such oil drops are formed.

Namely, the present process is substantially the same as the above-mentioned process (1) except that the colorant and other additives such as a charge-controlling agent are added. Accordingly, the detailed description of the polymerizable monomer, polymerization initiator and dispersion stabilizer as the starting materials is omitted.

Colorant Used

A known coloring pigment can be used. Appropriate examples are described below.

(a) Black Pigments

Carbon black, acetylene black, lamp black and aniline black.

(b) Yellow Pigments

Chrome yellow, zinc yellow, cadmium yellow, yellow iron oxide, Mineral Fast Yellow, nickel titanium yellow, naples yellow, Teftol Yellow S, Hansa Yellow 10G, Benzidine Yellow G, Quinoline Yellow Lake, Permanent Yellow NGG and Tartrazine Lake.

(c) Orange Pigments

Chrome orange, molybdenum orange, Permanent Orange GTR, Pyrazolone Orange, Vulcan Orange, Indanthrene Brilliant Orange, Benzidine Orange G and Indanthrene Brilliant Orange GK.

(d) Red Pigments

Red iron oxide, cadmium red, red lead, mercury cadmium sulfide, Permanent Orange 4R, Lithol Red, Pyrazolone Red, Watchung Red calcium salt, Lake Red D, Brilliant Carmine 6B, Eosine Lake, Rhodamine Lake B, Alizarine Lake and Brilliant Carmine 3B.

(e) Violet Pigments

Manganese violet, Fast Violet B and Methyl Violet Lake.

(f) Blue Pigments

Iron blue, cobalt blue, Alkali Blue Lake, Phthalcyanine Blue, metal-free Phthalocyanine Blue, partially chlorinated Phthalocyanine Blue, Fast Sky Blue and Indanthrene Blue BC.

(g) Green Pigments

Chrome green, chromium oxide, Pigment Green B, Marachite Green Lake and Final Yellow Green G.

(h) White Pigments

Zinc flower, titanium oxide, antimony white and zinc sulfide.

(i) Extender Pigments

Baryte powder, barium carbonate, clay, silica, white carbon, talc and alumina white.

It is preferred that the coloring pigment be incorporated in an amount of 1 to 20 parts by weight, especially 5 to 15 parts by weight, per 100 parts by weight of the polymerizable monomer.

Magnetic Material Pigments

As the magnetic material pigment, there are known, for example, triiron tetroxide ($Fe_3O_4$), diiron trioxide ($\gamma$-$Fe_2O_3$), zinc iron oxide ($ZnFe_2O_4$), yttrium iron oxide ($Y_3Fe_5O_{12}$), cadmium iron oxide ($Cd_3Fe_5O_{12}$), copper iron oxide ($CuFe_2O_4$), lead iron oxide ($PbFe_{12}O_{19}$), neodium iron oxide ($NdFeO_3$), borium iron oxide ($BaFe_{12}O_{19}$), magnesium iron oxide ($MgFe_2O_4$), manganese iron oxide ($MnFe_2O_4$), lanthanum iron oxide ($LaFeO_3$), iron powder (Fe), cobalt powder (Co) and nickel powder (Ni). Fine powders of these known magnetic materials can optionally be used. The magnetic material pigment is used in an amount of 1 to 200 parts by weight per 100 parts by weight of the polymerizable monomer.

Other additive agents

Known charge controlling agents such as metal soaps of naphthenic acid, metal soaps of fatty acids and soaps of resin acids can be incorporated for adjusting the charging property of the toner. The charge controlling agent is used an amount of 0.1 to 10 parts by weight, preferably 0.5 to 5 parts by weight, per 100 parts by weight of the polymerizable monomer.

A release agent such as low-molecular-weight polyethylene, low-molecular-weight polypropylene, a wax or a silicone oil can be incorporated for imparting an offset-preventing effect to the toner. The offset-preventing agent is incorporated in an amount of 0.1 to 10 parts by weight, preferably 0.5 to 5 parts by weight, per 100 parts by weight of the polymerizable monomer.

The suspending-dispersing step and oil drop-forming step are substantially the same as those adopted in the above-mentioned preparation process. Accordingly, the description of these steps is omitted.

Polymerization Step

Known polymerization temperature and time can be adopted. In general, it is sufficient if the polymerization is carried out at 40° to 100° C. for 1 to 50 hours. The stirring of the reaction mixture can be such gentle stirring as causing uniform reaction in the entire reaction mixture. In order to prevent inhibition of the polymerization by oxygen, the polymerization can be carried out while replacing the atmosphere of the reaction system by an inert gas such as nitrogen.

If the polymerization is carried out at a pH value of 7 to 8, the reaction efficiency is increased and the amount of the unreacted residual monomer can be advantageously reduced.

If the polymerization is carried out at a pH value larger than 11, an advantage of controlling formation of emulsion polymerization particles having a particle size smaller than 1 $\mu$m can be attained.

This adjustment of the pH value can be easily accomplished by addition of the above-mentioned alkali metal hydroxide.

Since the polymerization product is obtained in the form of particles having the above-mentioned particle size, colored particles for a toner can be obtained by recovering the formed particles by filtration, washing them with water or the like if necessary and drying them.

Carbon black, hydrophobic silica or the like can be sprinkled on the colored particles for a toner, whereby a final toner is obtained.

According to the present invention, a toner having a particle size of 1 to 30 $\mu$m, especially a particle size smaller than 10 $\mu$m, and a sharp particle size distribution can be obtained by the suspension polymerization.

This toner is substantially free of emulsion polymerization particles having a very fine particle size.

Accordingly, the toner obtained by the process of the present invention is excellent in the flowability and scattering of the toner or fogging is not caused at all.

(5) Process for Preparing Toner Particles by Adjusting pH Value of Dispersion Medium This process utilizes the above-mentioned process (3) for the preparation of polymer particles.

The present process is characterized in that a hardly soluble inorganic dispersant is used as the dispersant in an aqueous dispersion medium, the dispersion is kept alkaline at the step of forming suspended oil drops and the initial stage of the polymerization reaction, the dispersion is made neutral or acidic when the polymerization is advanced to some extent, and the polymerization is further conducted.

As the result of various experiments and investigations, we found that the pH value of a dispersion containing a hardly soluble inorganic dispersant the certain influences on the oil drop-forming property at the suspension granulation and the polymerization degree at the polymerization step. Namely, if the suspension dispersion is carried out in a strongly alkaline state, the stability of particles is improved and coalescence of particles is hardly caused, and particles having a particle size corresponding to the stirring speed and a sharp particle size distribution can be obtained. Furthermore, if the polymerization reaction is advanced while keeping the dispersion strongly alkaline, a polymer having a low polymerization degree is mainly formed, and if the polymerization is advanced in a neutral or acidic state, a polymer having a high polymerization degree is mainly formed. The present process has now been completed based on those findings.

According to the present process, suspended oil drops having desired particle size characteristics are formed while keeping the dispersion in such a strongly alkaline state that the pH value is larger than 11, the polymerization reaction is initiated in this strongly alkaline state, the pH value is changed to a neutral level lower than 11 when the polymerization reaction is advanced to some extent, and the remainder of the monomer component is polymerized to form a high-molecular-weight polymer component. The colored polymer particles (toner) prepared according to this process have substantially sharp particle size characteristics and are composed of a low-molecular-weight component and a high-molecular-weight component. According to the process of the present invention, a toner excellent in the developing property, fixing property and blocking resistance can be prepared in a high yield at a high productivity.

The starting materials used in this process are substantially the same as those used in the above-mentioned preparation process (4) of the present invention. The detailed description of the polymerizable monomer, colorant and other additives is therefore omitted.

The oil drop-forming step and polymerization step will now be described.

Oil Drop-Forming Step

In the present invention, the hardly soluble inorganic dispersant is added into water and the mixture is stirred to disperse the inorganic dispersant in water. An alkali metal hydroxide is added to the dispersion so that the pH value is larger than 11, and the mixture is further dispersed. As the alkali metal hydroxide, there can be used potassium hydroxide and sodium hydroxide.

The above-mentioned polymerizable composition is added to the dispersion having the pH value adjusted to a level higher than 11, and the suspension granulation is carried out by a high-speed shearing stirrer such as a homomixer or a homogenizer to form oil drops. It is generally preferred that the stirring be carried out at a rotation speed of 5,000 to 30,000 rpm, whereby the particle size of the formed oil drops is ordinarily adjusted to 5 to 20 μm.

At this oil drop-forming step, a small amount of a surface active agent can be used together with the hardly soluble inorganic solvent for enhancing the dispersion stabilizing effect, as in the above-mentioned preparation process (3).

Polymerization Step

In the present invention, at the start of the polymerization reaction, the alkali metal hydroxide is added to adjust the pH value of the dispersion to a level higher than 11, and the polymerization reaction is then carried out, whereby a low-molecular-weight polymer component having a low polymerization degree is formed. The degree of this reaction depends on the used monomer and polymerization initiator and the reaction temperature, but generally, the reaction is advanced to such an extent that the polymerization ratio is 20 to 80%, preferably 40 to 60%. For example, in the case where the reaction is carried out at 70° to 80° C. by using a polymerization initiator having a half-value period of 30 to 500 minutes as measured at 70° C. in an amount of 0.5 to 10 parts by weight per 100 parts by weight of the polymerizable monomer, it is preferred that the reaction be conducted for about 1 to about 10 hours from the start of the reaction. By this reaction, a polymer having a molecular weight of 5,000 to 500,000, preferably 8,000 to 100,000, can be obtained. When the polymerization ratio reaches the above-mentioned level, an acid is dropped into the dispersion to change the pH value to a level lower than 11, preferably 7 to 10, especially preferably 7 to 8. The dropping rate of the acid to the dispersion medium is generally 0.0001 to 0.01 g/cc.min and preferably 0.0005 to 0.01 g/cc.min. If the dropping rate is too high, the acid does not permeate uniformly into the dispersion and a heterogeneous portion is formed in the reaction mixture, and the molecular weight cannot be stably adjusted and no good results can be obtained. After the pH value of the dispersion has been thus changed, the polymerization is conducted until the reaction is completed. By this reaction, a high-molecular-weight polymer component having a high polymerization degree and a molecular weight of 10,000 to 10,000,000, preferably 5,000 to 300,000, is obtained.

In the present invention, the polymerization ratio during the reaction can be determined by sampling oil drops from the reaction mixture during the reaction and carrying out the measurement by using a known apparatus for measuring the polymerization ratio.

In the present invention, it is important that the pH value of the polymerization reaction mixture (dispersion) should be changed when the polymerization ratio is within the above-mentioned range. Since the pH value is changed at the final stage of the polymerization reaction, diffusion of the composition in the interior of the suspended oil drops is controlled, and there can be obtained polymer particles in which a high-molecular-weight polymer formed under influences of the neutral or acidic pH value of the dispersion are substantially present in the surfaces of the particles and a substantially low-molecular-weight polymer component is covered with the high-molecular-weight polymer component. If the pH value of the dispersion is changed before the polymerization ratio reaches the above-mentioned level, the amount of the high-molecular-weight polymer is increased and the fixing property is degraded. If the pH value of the reaction mixture (dispersion) is changed after the polymerization ratio exceeds the above-mentioned range, the proportion of the high-molecular-weight polymer component is reduced too much, with the result that the durability, heat resistance and offset resistance are degraded.

As is apparent from the foregoing description, according to the present invention, by adjusting the pH value of the dispersion (reaction mixture) at the polymerization reaction, a spherical toner having sharp particle size characteristics and having excellent developing characteristics, fixing property, durability and blocking resistance can be obtained in a short time by a simple operation.

After termination of the polymerization reaction, the formed particles are recovered by filtration, washed with water or an appropriate solvent if necessary and dried to obtain a toner.

Known external additives customarily used in this field, such as carbon black, hydrophobic silica, aluminum oxide, stearic acid and fine powders of polymers, are sprinkled on the colored particles for a toner according to need, and a final toner composition is thus prepared.

According to the present invention, by using a hardly soluble inorganic dispersant for preparing a dispersion medium and changing the pH value of the dispersion to a neutral or acidic level from a strongly alkaline level at a specific stage during the polymerization reaction, a toner comprising an interior polymer composed mainly of a low-molecular-weight component and an external polymer composed mainly of a high-molecular-weight component is obtained and the durability of the toner is improved, and it is possible to obtain a toner excellent in the developing property, flowability, fixing property and blocking resistance in a high yield.

(6) Toner Having Uniform Particle Size and Formed by Adjustment of pH Value of Dispersion Medium, and Process for Preparation of This Toner The process for the preparation of this toner according to the present invention is constructed by combining the above-mentioned processes (4) and (5). Namely, this process adopts the suspension polymerization technique, and according to this process, a polymerizable monomer, a colorant, a dispersant, the solubility of which is changed according to the pH value of the dispersion medium and which is precipitated at a predetermined pH value of the dispersion medium, and a radical polymerization initiator are suspended and dispersed in the dispersion medium, an acid or base is added to change the pH value to the predetermined level and form oil drops having a fine particulate size, the pH value of the dispersion is reduced in the midway of the polymerization, and the polymerization is further conducted.

The toner prepared according to this process is characterized in that in the toner particles, the molecular weight is gradually reduced toward the interior from the surface layer portion, the weight average molecular weight (Mw) of the polymer particles is 5,000 to 700,000, the ratio of the weight average molecular weight (Mw) to the number average molecular weight (Mn) is in the range of from 5 to 50, and the particle size distribution of the particles is sharp, the median diameter of the particles based on the volume is in the range of from 5 to 20 μm and the ratio of the 25% cumulative diameter (D25) based on the volume to the 75% cumulative diameter (D75) based on the volume is in the range of from 1.4 to 1.7.

The toner of the present invention is characterized in that the toner has specific particle size characteristics as mentioned above and in the polymer constituting the particles, there is formed a molecular weight gradient between the interior and the surface layer portion. Namely, the median diameter based on the volume is 5 to 20 μm and the particles have such a sharp particle size distribution that the D25/D75 ratio is in the range of from 1.4 to 1.7. By dint of these characteristics, the flowability and charge-storing property are improved and uniformalized and the toner shows excellent developing characteristics. Moreover, since the surface layer of the spherical particles is composed substantially of a high-molecular-weight polymer component having a weight average molecular weight of 10,000 to 1,000,000 and the interior of the spherical particles is composed substantially of a low-molecular-weight polymer component having a weight average molecular weight of 5,000 to 500,000, a mechanical strength is maintained at a high level by the high-molecular-weight component present in the surface layer, and by dint of the presence of the low-molecular-weight component in the interior, when a certain quantity of heat conducted to the toner at the fixing step, the toner is promptly melted and diffused on a transfer paper. Furthermore, an internal cohesive power is given to the molten toner by the molten high-molecular-weight component, and therefore, a good fixing property is manifested without occurrence of the offset phenomenon. Namely, by dint of the particle size characteristics of the toner particles and the molecular weight characteristics of the polymer constituting the particles, a good fixing property is given to the toner and the durability and blocking resistance are highly improved in the toner.

In the toner of the present invention, a molecular weight gradient is formed toward the interior from the surface layer in the particles, but there is no definite boundary in the particles and the polymer composition is uniform throughout the particles while only the molecular weight is continuously changed. Therefore, the toner of the present invention is distinguishable from the conventional microcapsule toner in the structure and object.

As the result of many experiments and investigations made by us, it was found that the pH value of a dispersion containing a hardly soluble inorganic dispersant has certain influences on the polymerization degree at the polymerization reaction. Namely, it was found that if the polymerization reaction is carried out in a strongly alkaline state, a polymer having a low polymerization degree is mainly formed and if the polymerization is carried out in a neutral or acidic state, a polymer having a high polymerization degree is mainly formed. The toner of the present invention is preferably prepared according to the following process constructed based on this finding.

A polymerizable composition is added to a dispersion medium containing a hardly soluble inorganic dispersant which is once dissolved by an acid (alkali) and is then precipitated and finely dispersed by an alkali (acid), and the polymerizable composition is suspended and dispersed in the dispersion medium to form oil drop particles having a sharp particle size distribution. The dispersion is made strongly alkaline and the polymerization is initiated and advanced. At the middle or final stage of the polymerization reaction, the dispersion is made neutral or acidic and the polymerization is further carried out, whereby polymer particles having a uniform particle size and a sharp particle size distribution are obtained. Thus, a toner composed of spherical particles, which has good flowability, fixing property and developing property and highly improved durability can be obtained in a short time.

In the present process, the starting materials are the same as those used in the processes (4) and (5), the oil drop-forming step is the same as adopted in the process (4), and the polymerization step is the same as adopted in the process (5). Accordingly, the detailed description is omitted.

The present invention will now be described in detail with reference to the following examples that by no means limit the scope of the invention.

Examples of Preparation of Polymer Particles Having Uniform Particle Size

EXAMPLE 1

To 400 parts of water was added 10 parts by weight of $Ca_3(PO_4)_2$, and 38 parts of 12N hydrochloric acid was added to the dispersion to dissolve $C_3(PO_4)_2$.

A monomer composition comprising 80 parts by weight of monomeric styrene, 18 parts by weight of 2-ethylhexyl methacrylate, 2 parts by weight ethylene glycol dimethacrylate and 3 parts by weight of 2,2'-azobis(2,4-dimethylvaleronitrile) was added to the dispersion medium containing $Ca_3(PO_4)_2$ dissolved therein.

The dispersion was stirred at 11,000 rpm for 3 minutes by a TK homomixer (supplied by Tokushu Kika Kogyo), and 102 parts by weight of 4N sodium hydroxide was added to the dispersion to precipitate $Ca_3(PO_4)_2$. At this point, the pH value of the aqueous phase was 9.

The dispersion was further stirred at 11,000 rpm for 60 minutes to obtain a suspended dispersion.

The suspended dispersion was transferred into a separable flask, and polymerization was carried out in a nitrogen atmosphere at a rotation rate of 80 rpm and a temperature of 70° C. for 6 hours.

After the polymerization reaction, the polymer was treated with a dilute acid, washed with water and dried to obtain spherical polymer particles.

When the particle size distribution of the obtained polymer particles was measured by a Coulter counter, it was found that the average particle size was 18 μm, the proportion of the particles having a particle size smaller than 8 μm was 1.7%, and the proportion of the particles having a particle size larger than 25 μm was 2.0%.

EXAMPLE 2

The procedures of Example 1 were repeated in the same manner except that the amount of $Ca_3(PO_4)_2$ was changed to 7 parts by weight, the amount of 12N hydrochloric acid was changed to 23 parts by weight and 0.04 part by weight of sodium dodecyl benzene-sulfonate was further added. The monomer composition was added to the dispersion medium, and 72 parts by weight of 4N sodium hydroxide (NaOH) was added to precipitate $Ca_3(PO_4)_2$. At this point, the pH value of the aqueous phase was 9.

The polymerization was carried out in the same manner as described in Example 1 except that the rotation rate was changed to 10,000 rpm and the polymerization time was changed to 60 minutes, whereby spherical polymer particles were obtained.

The particle size distribution of the obtained polymer particles, the molecular weight distribution determined by GPC, Tg (°C.), Ti (°C.) and Tm (°C.) determined by a flow tester, the content (%) of the residual monomer and the state of formation of particles having a particle size smaller than 1 μm as the byproduct are shown in Table 1.

EXAMPLE 3

The procedures of Example 2 were repeated in the same manner except that the amount added of 12N hydrochloric acid was changed to 13 parts and the amount added of 4N sodium hydroxide was changed to 41 parts by weight, and at an aqueous phase pH value of 9, the suspension granulation was effected and the polymerization was carried out to obtain spherical polymer particles.

The characteristics, such as the particle size distribution, of the obtained polymer particles are shown in Table 1.

EXAMPLE 4

The procedures of Example 2 were repeated in the same manner except that the amount added of 12N hydrochloric acid was changed to 23 parts by weight and the amount added of 4N sodium hydroxide was changed to 66 parts by weight. At an aqueous phase pH value of 7, the suspension granulation was effected and the polymerization was carried out to obtain spherical particles.

Characteristics, such as the particle size distribution, of the obtained polymer particles are shown in Table 1.

EXAMPLE 5

The procedures of Example 2 were repeated in the same manner except that the amount added of 12N hydrochloric acid was changed to 13 parts by weight and the amount added of 4N sodium hydroxide was changed to 37 parts by weight. At an aqueous phase pH value of 7, the suspension granulation was effected and the polymerization was carried out to obtain spherical polymer particles.

Characteristics, such as the particle size distribution, of the obtained polymer particles are shown in Table 1.

EXAMPLE 6

The procedures of Example 2 were repeated in the same manner except that the amount added of 12N hydrochloric acid was changed to 23 parts by weight and the amount added of 4N sodium hydroxide was changed to 91 parts by weight. At an aqueous phase pH value of 14, the suspension granulation was effected, and the polymerization reaction was carried out to obtain spherical polymer particles.

Characteristics, such as the particle size distribution, of the obtained polymer particles are shown in Table 1.

EXAMPLE 7

The procedures of Example 2 were repeated in the same manner except that the amount added of 12N hydrochloric acid was changed to 13 parts by weight and the amount added of 4N sodium hydroxide (NaOH) was changed to 52 parts by weight. At an aqueous phase pH value of 14, the suspension granulation was effected, and the polymerization was carried out to obtain spherical polymer particles.

Characteristics, such as the particle size distribution, of the obtained polymer particles are shown in Table 1.

COMPARATIVE EXAMPLE 1

To 400 parts by weight of water was added 10 parts by weight of $Ca_3(PO_4)_2$, and $Ca_3(PO_4)_2$ was dispersed in water by an ultrasonic vibration.

The same monomer composition as used in Example 1 was added to the obtained aqueous dispersion, and the liquid was dispersed at 11,000 rpm for 60 minutes by a TK homomixer to obtain a suspended dispersion.

In the same manner as described in Example 1, the polymerization was carried out to obtain spherical polymer particles. When the particle size distribution of the obtained polymer particles was measured by a Coulter counter, it was found that the average particle size was 26 μm, the proportion of the particles smaller than 10 μm was 2% and the proportion of the particles larger than 32 μm was 25%. Thus, it was confirmed that the particle size distribution was broad.

COMPARATIVE EXAMPLE 2

Spherical polymer particles were prepared in the same manner as described in Comparative Example 1 except that 0.04 part by weight of sodium dodecyl benzene-sulfonate was added together with $Ca_3(PO_4)_2$. The particle size distribution of the obtained polymer particles was measured by a Coulter counter. It was found that the average particle size was 24 μm, the proportion of the particles having a particle size smaller than 10 μm was 3% and the proportion of the particles having a particle size larger than 32 μm was 23%. Accordingly, it was confirmed that the particle size distribution was broad.

COMPARATIVE EXAMPLE 3

To 400 parts by weight of water were added 10 parts by weight of $Ca_3(PO_4)_2$, 0.04 part by weight of sodium dodecyl benzene-sulfonate and 38 parts by weight of 12N hydrochloric acid, and the mixture was stirred by a magnetic stirrer to dissolve $Ca_3(PO_4)_3$. Then, 102 parts by weight of 4N sodium hydroxide was added to precipitate $Ca_3(PO_4)_2$.

In the same manner as described in Comparative Example 1, the monomer composition was added to obtain a suspended dispersion and the polymerization was carried out to obtain spherical polymer particles. When the particle size distribution of the obtained polymer particles was measured by a Coulter counter, it was found that the average particle size was 18 μm, the proportion of the particles having a particle size smaller than 8 μm was 2.0% and the proportion of the particles having a particle size larger than 25 μm was 6.0%. Thus, it was confirmed that the particle size distribution was broad.

From the foregoing examples and comparative examples, it is seen that if $Ca_3(PO_4)_2$ is dissolved in an aqueous solution of an acid, a composition comprising a polymerizable monomer is added and suspension-dispersed into the solution, an alkali metal hydroxide is added to the dispersion to precipitate the dissolved $ca_3(PO_4)_3$ and the polymerization is carried out in this state, polymer particles having a sharp particle size distribution can be obtained while controlling formation of ultrafine particles or coarse particles.

From Examples 2 through 7, it is seen that even if the pH value in the aqueous phase is the same, when the salt concentration in the aqueous phase is changed according to the amount added of the acid or alkali, the molecular weight of the formed polymer greatly differs.

In contrast, even if the salt concentration is made equal according to the amount added of the acid or alkali, if the pH value is different, the molecular weight of the formed polymer greatly differs. Accordingly, it is seen that the molecular weight of the formed polymer can be controlled by changing the pH value of the aqueous phase and the salt concentration at the polymerization.

As is apparent from the foregoing description, according to the polymerization process of the present invention, polymer particles having a very sharp particle size distribution can be obtained, and the molecular weight can be effectively controlled.

phase to 9 and precipitate $Ca_3(PO_4)_2$. Then, stirring was further conducted for 20 minutes to form suspended oil drops having an average particle size of 10.4 μm.

This suspension was subjected to polymerization at 80° C. in an $N_2$ current for 12 hours.

The precipitate was separated from the supernatant, treated with a dilute acid, washed with water and dried to obtain a toner.

When the particle size of the obtained toner was measured by a Coulter counter, it was found that the volume average particle size D50 was 10.4 μm and the D25/D75 ratio was 1.5, and it was confirmed that the toner had a sharp particle size distribution. The residual monomer content in the obtained toner was 0.73%.

When the copying operation was carried out in a

TABLE 1

|  | Example 2 | Example 3 | Example 4 | Example 5 | Example 6 | Example 7 |
|---|---|---|---|---|---|---|
| pH value | 9 | 9 | 7 | 7 | 14 | 14 |
| Amount Added of HCl (parts by weight) | 23 | 13 | 23 | 13 | 23 | 13 |
| Amount Added of NaOH (parts by weight) | 72 | 41 | 66 | 37 | 91 | 52 |
| Particle Size Distribution |  |  |  |  |  |  |
| average particle size (μm) | 12 | 13 | 9 | 10 | 15 | 15 |
| dispersion degree $D_{25}/D_{75}$ | 1.49 | 1.51 | 1.55 | 1.57 | 1.32 | 1.35 |
| fine particle content (%) | below 5 μm, 0.2 | below 5 μm, 0.2 | below 5 μm, 3.4 | below 5 μm, 4.2 | below 8 μm, 0.1 | below 8 μm, 0.1 |
| coarse particle content (%) | above 20 μm, 1.0 | above 20 μm, 1.3 | above 16 μm, 1.2 | above 16 μm, 1.8 | above 20 μm, 0.9 | above 20 μm, 1.1 |
| Molecular Weight by GPC |  |  |  |  |  |  |
| $M_W (\times 10^5)$ | 1.6 | 2.9 | * | * | 0.59 | 0.84 |
| $M_W/M_N$ | 5.59 | 10.04 | * | * | 3.30 | 4.13 |
| Flow Tester Measurement |  |  |  |  |  |  |
| Tg | 68 | 66 | 68 | 67 | 65 | 65 |
| Ti | 108 | 114 | 128 | 131 | 90 | 95 |
| Tm | 142 | 150 | 170 | 184 | 108 | 120 |
| Residual Monomer Content (%) | 0.5 | 0.6 | 0.2 | 0.2 | 1.6 | 1.5 |
| State of Formation of Particles Having Particle Size Smaller Than 1 μm as by-product | medium | medium | large | large | small | small |

*measurement was impossible because polymer was not dissolved in THF

Examples of Preparation of Toners

EXAMPLE 8

Aqueous Phase

To 670 parts by weight of distilled water was added 7 parts by weight of $Ca_3(PO_4)_3$, and while the inorganic salt was dispersed by a stirrer, 23 parts by weight of HCl was added to sufficiently dissolve $Ca_3(PO_4)_2$. Then, 17 parts by weight of a 0.2% aqueous solution of NaDBS was further added to the solution.

| Oil Phase | |
|---|---|
| Styrene | 82 parts by weight |
| 2-Ethylhexyl methacrylate | 18 parts by weight |
| Grafted carbon black | 5 parts by weight |
| Spilon Black TRH | 1 part by weight |
| Divinylbenzene | 0.2 part by weight |
| Diethylene glycol dimethacrylate | 1.5 parts by weight |
| AIBN | 0.32 part by weight |
| ADVN | 2.5 parts by weight |

The above-mentioned oil phase was added to the aqueous phase, and the mixture was stirred at 11,000 rpm for 3 minutes by a homomixer supplied by Tokushu Kika to sufficiently disperse the oil phase. Then, stirring was similarly continued and 65 parts by weight of 4N NaOH was added to adjust the pH value of the aqueous commercially available electrophotographic copying machine (Model DC-111C supplied by Mita Kogyo) by using the obtained toner, a shape image having a good density in the solid color portion and a good resolution was obtained.

EXAMPLE 9

An aqueous phase having a pH value of 7 was prepared in the same manner as described in Example 8 except that the amount added of the 0.2% solution of NaDBS was changed to 5 parts by weight and the amount added of 4N NaOH was changed to 60 parts by weight. Then, stirring was conducted at 9,800 rpm for 20 minutes to form suspended oil drops having an average particle size of 9.8 μm.

Then, 5 parts by weight of 4N NaOH was added to the obtained suspension to adjust the pH value of the aqueous phase to 9, and polymerization was carried out at 80° C. in an $N_2$ current for 12 hours to obtain a polymer. The precipitate was separated from the supernatant, treated with a dilute acid, washed with water and dried to obtain a toner. The supernatant separated was substantially transparent.

When the particle size of the obtained toner was measured by a Coulter counter, it was found that the volume average particle size (D50) was 9.7 μm and the D25/D75 ratio was 15, and it was confirmed that the toner had a sharp particle size distribution. The residual monomer content in the toner was 0.72%.

It was confirmed that even if the amount of the surface active agent is much reduced as compared with the amount used in Example 8, a toner having a sharp particle size distribution can be obtained.

When the copying operation was carried out in an electrophotographic copying machine (Model DC-111C supplied by Mita Kogyo) by using the obtained toner, a sharp image having a good density in the solid color portion and a good resolution was obtained.

EXAMPLE 10

In the same manner as described in Example 8, the pH value of the aqueous phase was adjusted to 9 and stirring was conducted at 1,100 rpm for 20 minutes to form suspended oil drops. At the polymerization, 2 parts by weight of HCl was added to adjust the pH value to 7, and polymerization was carried out at 80° C. in an $N_2$ current. The polymerization was completed in such a short time as 7 hours.

The obtained polymerization product was separated into a precipitate and a supernatant, and the precipitate was treated with a dilute acid, washed with water and dried to obtain a toner. The supernatant was substantially transparent.

When the measurement of the particle size distribution and the copying test were carried out in the same manner as described in Example 8, it was found that the volume average particle size (D50) was 10.3 μm and the particle size distribution was so sharp that the D25/D75 ratio was 1.50, the residual monomer content in the toner was 0.75%, and an image having a good density in the solid color portion and a good resolution was obtained.

EXAMPLE 11

The procedures of Example 8 were repeated in the same manner except that at the precipitation of $Ca_3(PO_4)_2$, the pH value was adjusted to 14 by using 83 parts by weight of 4N NaOH and stirring was conducted at 11,000 rpm for 20 minutes. Oil drops having an average particle size of 11.2 μm and such a sharp particle size distribution that the D25/D75 ratio was 1.33 were obtained. Then, 6 parts by weight of HC was added to the suspension to adjust the pH value to 9, and the polymerization was carried out at 80° C. in an $N_2$ current for 12 hours to obtain a toner.

The polymerization product was separated into a precipitate and a supernatant. The precipitate was treated with a dilute acid, washed with water and dried to obtain a toner. The supernatant was substantially transparent.

When the measurement of the particle size distribution and the copying test were carried out in the same manner as described in Example 8, it was found that the volume average particle size (D50) was 11.1 μm, the particle size distribution was so sharp that the D25/D75 ratio was 1.33, the residual toner content in the toner was 0.71%, and the obtained image had a good density in the solid color portion and a satisfactory resolution.

EXAMPLE 12

In the same manner as described in Example 8, suspended oil drops were formed by adjusting the pH value to 9, and at the polymerization, 18 parts by weight of 4N NaOH was further added to adjust the pH value to 14 and the polymerization was carried out at 80° C. in an $N_2$ current for 12 hours.

The obtained polymerization product was separated into a precipitate and a supernatant, and the precipitate was treated with a dilute acid, washed with water and dried to obtain a toner.

The supernatant was transparent and formation of particles as the by-product was hardly observed. The dilute acid treatment and water washing treatment were greatly facilitated.

When the measurement of the particle size distribution and the copying test were carried out in the same manner as described in Example 8, it was found that the volume average particle size (D50) was 10.3 μm, the particle size distribution was so sharp that the D25/D75 ratio was 1.51, the residual monomer content in the toner was 0.73%, and a sharp image having a good density of the solid color portion and a good resolution was obtained.

COMPARATIVE EXAMPLE 4

To 670 parts by weight of water was added 7 parts by weight of $Ca_3(PO_4)_2$, and without performing the operations of dissolving and precipitating $Ca_3(PO_4)_2$, 40 parts by weight of a 0.2% solution of NaDBS was added with stirring by a stirrer.

The same oil phase as used in Example 8 was added to the aqueous phase and the mixture was stirred at 11,000 rpm for 25 minutes to obtain suspended oil drops having an average particle size of 10.3 μm.

The suspension was subjected to polymerization at 80° C. in an $N_2$ current for 12 hours. The polymerization product was separated into a precipitate and a supernatant, and the precipitate was treated with a dilute acid, washed with water and dried to obtain a toner.

Formation of particles as the by-product was conspicuous in the supernatant, and the supernatant was opaque. When the average particle size and particle size distribution of the toner were measured, it was found that the volume average particle size (D50) was 10.1 μm but the particle size distribution was so broad that the D25/D75 ratio was 3.32. The obtained copied image was satisfactory in the density but the resolution was low, and defacement and blurring were caused in portions of letters and fine lines.

With respect to each of the toners obtained in the examples and comparative examples, a developer was prepared by adding 0.2 part by weight of hydrophobic silica to 100 parts by weight of the toner to form a toner composition and mixing the toner composition with a ferrite carrier having an average particle size of 90 μm so that the toner concentration was 4.0%.

The printing resistance test was carried out under normal temperature and normal humidity conditions (20° C. and 60% relative humidity) and high temperature and high humidity conditions (35° C. and 85% relative humidity) by using an electrophotographic copying machine (Model DC-111C supplied by Mita Kogyo). The obtained results are shown in Table 2.

Incidentally, D25, D50 and D75 in the examples and comparative examples represent the particle sizes observed when the volume or weight ratios reach 25%, 50% and 75%, respectively, in cumulating the particle sizes from smaller particles.

TABLE 2

|  | Example 8 | Example 9 | Example 10 | Example 11 | Example 12 | Comparative Example 4 |
| --- | --- | --- | --- | --- | --- | --- |
| Initial Image |  |  |  |  |  |  |
| density of solid color portion | 1.396 | 1.399 | 1.390 | 1.401 | 1.402 | 1.393 |
| fog density | 0.001 | 0.001 | 0.001 | 0.001 | 0.003 | 0.005 |
| resolution (lines/mm) | 4.5 | 4.0 | 4.0 | 5.0 | 4.0 | 3.2 |
| Printable Copy Number* |  |  |  |  |  |  |
| 20° C., 60% | 30,000 | 30,000 | 30,000 | 30,000 | 40,000 | 5,000 |
| 35° C., 85% | 25,000 | 30,000 | 25,000 | 25,000 | 30,000 | 2,000 |

Note
*The printable copy number indicates the number of obtainable copies in which the density of the solid color portion is at least 1.2, the fog density is lower than 0.008 and the resolution is at least 3.2 lines/mm.

As is apparent from Table 2, it is seen that the toners obtained in the examples give sharp images having a high density and an excellent resolution without fogging, and the durability is improved.

Since the toner of Example 11 has a very sharp particle size distribution, the resolution is especially highly improved. Furthermore, it is seen that the toner of Example 12 shows a very good printing resistance at the printing resistance test because incorporation of by-product particles is much controlled.

EXAMPLE 13

Aqueous Phase

To 440 parts of water was added 7 parts by weight of tricalcium phosphate, and while sufficiently dispersing the mixture by a stirrer, 23 parts by weight of 12N hydrochloric acid was added to dissolve the tricalcium phosphate, and 17 parts by weight of 2% sodium dodecyl benzene was added.

| Polymerizable Composition | |
| --- | --- |
| Styrene | 82 parts by weight |
| 2-Ethylhexyl methacrylate | 18 parts by weight |
| Grafted carbon black | 5 parts by weight |
| Spilon Black TRH (charge controlling agent) | 1 part by weight |
| Styrene/sodium styrene-sulfonate copolymer | 2.5 parts by weight |
| Divinylbenzene | 0.2 part by weight |
| 2EG | 1.5 parts by weight |
| ADVN (half-value period a 70° C. = 40 minutes) | 2.5 parts by weight |
| AIBN (half-value period at 90° C. = 300 minutes) | 0.32 part by weight |

The foregoing components were sufficiently mixed with stirring to form a polymerizable composition and added to the aqueous phase. While stirring the mixture at 11,000 rpm by a homomixer (supplied by Tokushu Kika), 83 parts by weight of 4N NaOH was added to adjust the pH value in the aqueous phase above 11 and precipitate the dissolved tricalcium phosphate, and the dispersion was further stirred for 20 minutes to form suspended oil drops having an average particle size of 10.5 μm.

The obtained suspension was transferred into a separable flask, and the polymerization was carried out at 80° C. in an $N_2$ current. When two hours had passed from the start of the polymerization, 6 parts by weight of 12N hydrochloric acid was added to the polymerization mixture at a rate of 0.001 g/cc.min by a microfeeder to adjust the pH value of the aqueous phase to 7. Then, the polymerization reaction was conducted for 7 hours to complete the polymerization.

The polymerization product was subjected to solid-liquid separation, and the solid was treated with a dilute acid, washed with water and dried to obtain a powdery toner.

When the particle size distribution of the obtained toner was measured by a Coulter counter, it was found that the volume average particle size (D50) was 10.4 μm, the dispersion degree (D25/D75) of the particle size was 1.4 and the particle size distribution was very sharp. When the molecular weight of the toner was measured by GPC, it was found that the weight average molecular weight (Mw) was 160,000 and the dispersion degree (Mw/Mn) was 16. Accordingly, it was confirmed that the molecular weight expanded from the low-molecular weight region to the high-molecular-weight region (see FIG. 1).

Then, 100 parts by weight of the toner was mixed with 0.2 part weight of hydrophobic silica to form a toner composition, and a developer was prepared by mixing this toner composition with a ferrite carrier having an average particle size of 90 μm so that the toner construction was 4.0%. Various tests were carried out in a remodelled machine of electrophotographic copying machine Model DC-1205 (supplied by Mita Kogyo). The obtained results are shown in Table 3.

EXAMPLE 14

In the same manner as described in Example 13, suspended oil drops having an average particle size of 10.5 μm were formed, and in the same manner as described in Example 13, the polymerization was started. When 3 hours had passed from the start of the polymerization, the pH value was charged to 9 and then, the polymerization was conducted for 7.5 hours to complete the polymerization reaction.

The volume average molecular weight (D50) of the obtained toner was 11.0 μm, and the dispersion degree (D25/D75) of the particle size was 1.41 and the toner showed a sharp particle size distribution. When the molecular weight distribution of the toner was measured by GPC, it was found that the weight average molecular weight (Mw) was 145,000 and the dispersion degree (Mw/Mn) of the molecular weight was 15, and it was confirmed that the molecular weight expanded from the low-molecular-weight region to the high-molecular-weight region. In the same manner as described in Example 13, a developer was prepared and the copying test was carried out. The obtained results are shown in Table 3.

COMPARATIVE EXAMPLE 5

A polymerizable composition prepared in the same manner as described in Example 13 except that 2.5 parts by weight of ADVN (half-value period at 70° C.=40 minutes) and 0.5 part by weight of ACHN ( half-value period at 90° C.=370 minutes) were added as the polymerization initiators to the same aqueous phase as used in Example 13, and 83 parts by weight of 4N-NaOH was added to precipitate tricalcium phosphate and the dispersion was stirred at 11,000 rpm to form suspended oil drops having an average particle size of 11.2 μm.

The obtained suspension was transferred into a separable flask and the polymerization was carried out at 80° C. in an $N_2$ current for 15 hours. Since the half-value period of the second initiator was long, a long time was necessary for completion of the polymerization and coalescence of particles was conspicuous. The obtained polymerization product was subjected to soil-liquid separation, and the solid was treated with a dilute acid, washed with water and sufficiently dried to obtain a toner.

Figure 2:
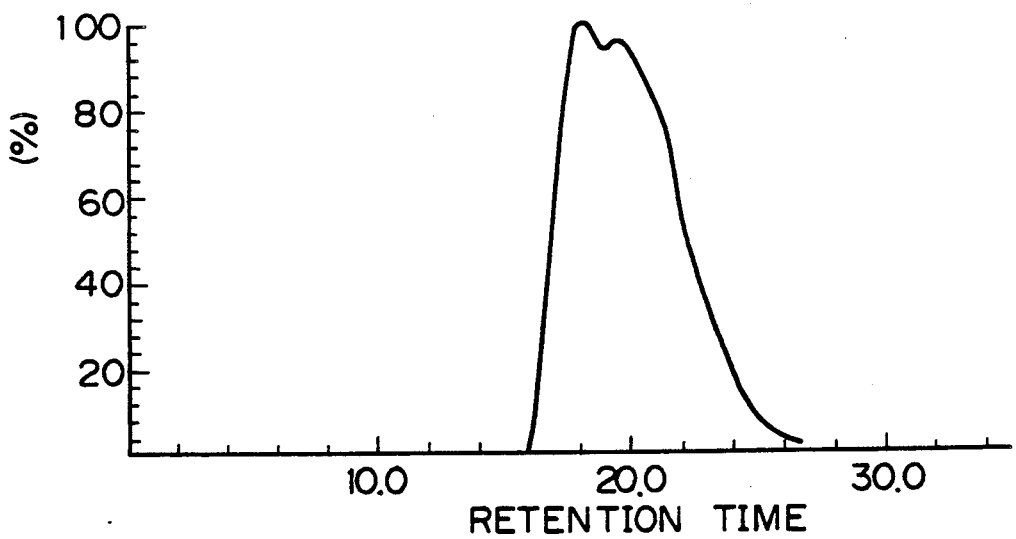
FIG. 2 is a curve showing the molecular weight distribution, determined by GPC, of the toner obtained in Comparative Example 5.

The volume average molecular weight (D50) of the obtained toner was 12.3 μm and the dispersion degree (D25/D75) of the particle size was 1.78, and it was confirmed that the toner had a broad particle size distribution. When the molecular weight distribution of the toner was measured by GPC, it was found that the weight average molecular weight (Mw) was 116,000 and the dispersion degree (Mw/Mn) of the molecular weight was 6. In the same manner as described in Example 13, a developer was prepared and the copying test was carried out (the molecular weight distribution curve is shown in FIG. 2). The obtained results are shown in Table 3.

The fixing property referred to in Table 3 was determined in the following manner. The temperature of a heating roller of a remodelled machine of Model DC-1205 of the heating and pressing roll fixation type was elevated stepwise by 2.5° C. from 100° C., and a transfer paper having a toner image formed thereon was passed through the heating roller to effect fixation. An adhesive tape was pressed to the fixed image and then, the adhesive type was peeled. The density of the fixed image was measured before and after the peeling by a reflection densitometer (supplied by Tokyo Denshoku), and the temperature at which the fixing ratio represented by the following formula:

$$\text{Fixing ratio (\%)} = \frac{\text{image density after peeling}}{\text{image density before peeling}} \times 100$$

was at least 90% was determined, and the lowest fixing temperature and the high-temperature offset-causing temperature were determined.

The blocking resistance was evaluated by observing the state of the toner during the copying test or in a developing device after the copying test.

TABLE 3

| | Particle Size Characteristics | | Molecular Weight Characteristics | | Image Characteristics (20,000th copy) | | Lowest Fixing Temperature (°C.) | High-Temperature Offset-Causing Temperature (°C.) |
|---|---|---|---|---|---|---|---|---|
| | $D_{50}$ | $D_{25}/D_{75}$ | $M_W$ | $M_W/M_n$ | image density | resolution (lines/mm) | | |
| Example 13 | 10.4 | 1.40 | 160000 | 16 | 1.38 | 7.1 | 125 | 185 |
| Example 14 | 11.0 | 1.41 | 145000 | 15 | 1.39 | 6.3 | 120 | 180 |
| Comparative Example 5 | 12.3 | 1.78 | 116000 | 6 | 1.37 | 5.0 | 135 | 170 |

EXAMPLE 15

Aqueous Phase

To 440 parts of water was added 7 parts by weight of tricalcium phosphate, and while sufficiently dispersing the mixture by a stirrer, 23 parts by weight of 12N hydrochloric acid was added to dissolve the tricalcium phosphate, and 17 parts by weight of 2% sodium dodecyl benzene-sulfonate was added to prepare an aqueous phase.

| Oil Phase | |
|---|---|
| Styrene | 82 parts by weight |
| 2-Ethylhexyl methacrylate | 18 parts by weight |
| Grafted carbon black | 5 parts by weight |
| Spilon Black TRH8 (charge-controlling agent) | 1 part by weight |
| Styrene/sodium styrene-sulfonate copolymer | 2.5 parts by weight |
| Divinylbenzene | 0.2 part by weight |
| 2EG | 1.5 parts by weight |
| ADVN (half-value period at 70° C. = 40 minutes) | 2.5 parts by weight |
| AIBN (half-value period at 70° C. = 300 minutes) | 0.32 part by weight |

The above-mentioned oil phase-forming materials were sufficiently mixed with stirring, and the formed oil phase was added to the aqueous phase, and while stirring the mixture by a TK homomixer supplied by Tokusho Kika at 11,000 rpm, 83 parts by weight of 4N NaOH was added to adjust the pH value above 11 and precipitate the dissolved tricalcium phosphate. The dispersion was stirred for 20 minutes to form suspended oil drops having an average particle size of 11.2 μm.

Figure 3:
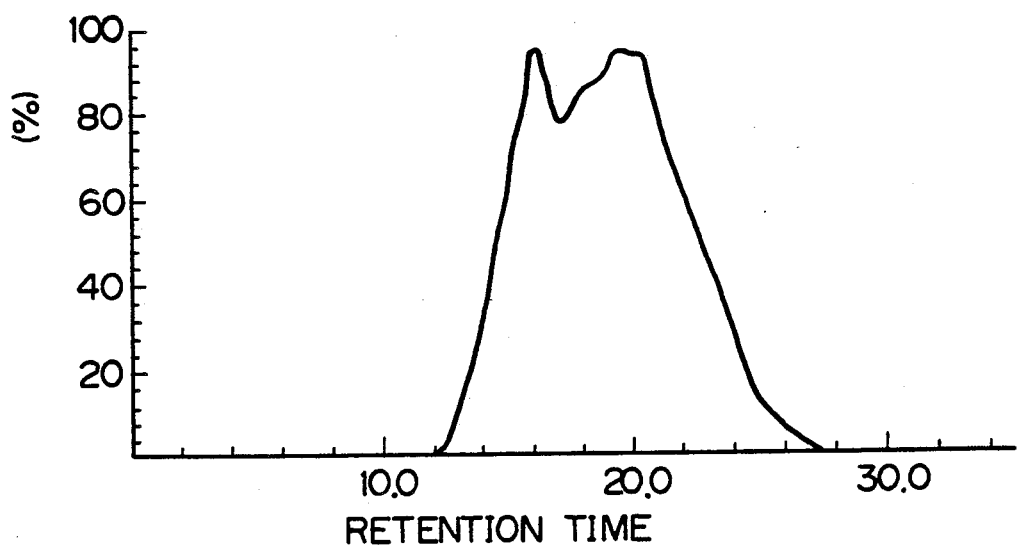
FIG. 3 is a curve showing the molecular weight distribution, determined by GPC, of the toner obtained in Example 15.

Then, the obtained suspension was transferred into a separable flask and the polymerization was initiated at 80° C. in an $N_2$ current. After 5 hours, 6 parts by weight of 12N hydrochloric acid was added to the polymerization mixture at a rate of 0.001 g/cc.min by a microfeeder to adjust the pH value to 7. Then, the polymerization was further conducted for 3 hours to complete the polymerization. The polymerization product was subjected to solid-liquid separation. The solid was treated with a dilute acid, washed with water and dried to obtain a toner. Incidentally, when 5 hours had passed from the start of the polymerization, the polymerization ratio was 68%. When the particle size of the obtained toner was measured by a Coulter counter, it was found that the volume average particle size D50 was 11.2 μm and the dispersion degree D25/D75 was 1.41, and the toner had a very sharp particle size distribution. When the molecular weight was measured by GPC, as shown in FIG. 3, the weight average molecular weight (Mw) was 145,000 and the dispersion degree (Mw/Mn) was 15. The flowability of the toner was very good. In an oven maintained at 60° C., 20 g of the toner was charged in a glass cylinder having an inner diameter of 26.5 mm, and 100 g of a weight was placed on the toner and the toner was allowed to stand still for 30 minutes in this state. Then, the cylinder was extracted and it was checked whether or not the toner collapsed. At this heat resistance test, when the cylinder was extracted, the toner of the present example simultaneously collapsed. Accordingly, it was confirmed that blocking was not caused and the toner had an excellent heat resistance.

Then, 100 parts by weight of the obtained toner was mixed with 0.2 part by weight of hydrophobic silica to form a toner composition, and the toner composition was mixed with a ferrite carrier having an average particle size of 90 μm so that the toner concentration was 4.0%. When the copying test was carried out in a remodelled machine of an electrophotographic copying apparatus (Model DC-1205 supplied by Mita Kogyo) by using the obtained toner, a sharp image having a high density in the solid color portion and a resolution of 7 lines/mm was obtained without fogging. A similar image was obtained under high temperature and high humidity conditions (35° C. and relative humidity of 85%).

When the fixing property was examined, it was found that the lowest fixing temperature was 120° C. and the high-temperature offset-causing temperature was 180° C., and it was confirmed that the fixing-possible temperature range was broadened.

EXAMPLE 16

Figure 4:
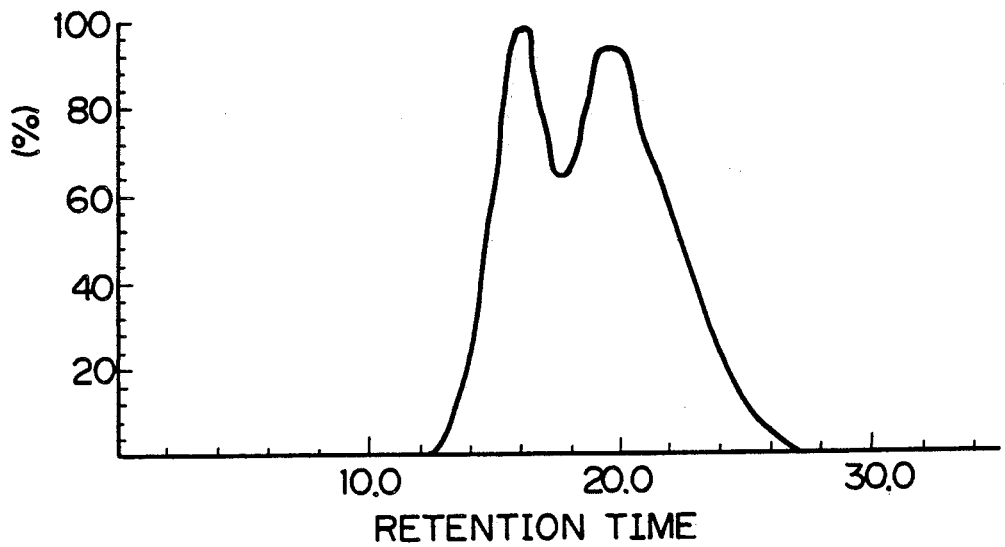
FIG. 4 is a curve showing the molecular weight distribution, determined by GPC, of the toner obtained in Comparative Example 6.

In the same manner as described in Example 15, suspended oil drops having an average particle size of 10.5 μm were formed and the polymerization reaction was initiated. The change of the pH value was carried out after 3 hours from the start of the polymerization reaction, and the polymerization was further conducted for 5 hours at a pH value of 7. The polymerization ratio after 3 hours from the start of the polymerization was 50%. The volume average particle size (D50) of the obtained toner was 10.5 μm and the dispersion degree (D25/D75) of the particle size was 1.43, and the particle size distribution was very sharp. When the molecular weight distribution was determined by GPC, a distribution curve as shown in FIG. 4 was obtained, and it was found that the weight average molecular weight (Mw) was 155,000 and the dispersion degree (Mw/Mn) of the molecular weight was 17. The flowability of the toner was very good, and at the heat resistance test, blocking was not caused at 60° C. When the copying test was carried out in the same manner as described in Example 15, the density of the solid color portion was sufficient, fogging was not caused and the resolution was 7 lines/mm, and the obtained image was very sharp. At the fixing test, the lowest fixing temperature was 125° C. and the high-temperature offset-causing temperature was 200° C., and the fixing-possible temperature range was very broad.

When the toner of the present example was compared with a comparative toner having substantially the same molecular weight distribution curve by GPC, it was found that the toner of the present example showed a very high heat resistance at the heat resistance test. Accordingly, it was confirmed that even if the profile of the molecular weight distribution by GPC is the same, the heat resistance is highly improved in the toner of the present invention where the high-molecular-weight component is convergently present in the surface portion of the particles.

COMPARATIVE EXAMPLE 6

Suspended oil drops having an average particle size of 11.3 um were formed by suspending and dispersing the same aqueous phase and oil phase as used in Example 15. Then, the polymerization was carried out at 80° C. in an $N_2$ current for 50 minutes, and 6 parts by weight of 12N hydrochloric acid was added at a rate of 0.001 g/cc min by a microfeeder to adjust the pH value of the aqueous phase to 7. Then, the polymerization reaction was further conducted for 7 hours. The polymerization product was subjected to solid-liquid separation, and the solid was treated with a dilute acid, washed with water and dried to obtain a toner. The polymerization ratio after 50 minutes from the start of the polymerization was 20%.

When the particle size distribution of the toner was measured, it was found that the volume average particle size (D50) was 11.4 um and the dispersion degree was 1.44. When the molecular weight characteristics were determined by GPC, it was found that the weight average molecular weight (Mw) was 250,000 and the dispersion degree (Mw/Mn) was 5.

The obtained toner was subjected to the heat resistance test, fixing test and copying test in the same manner as described in Example 15. It was found that the heat resistance was good and blocking was not caused. However, at the fixing test, the lowest fixing temperature was 140° C. and the high-temperature offset-causing temperature was 190° C., and the fixing-possible temperature was narrow and the fixing property at low temperatures was poor. The image characteristics were tolerably good.

COMPARATIVE EXAMPLE 7

In the same manner as described in Example 15, suspended oil drops having an average particle size of 11.2 μm were formed by using the same aqueous phase and oil phase as used in Example 15. Then, the polymerization reaction was carried out at 80° C. in an $N_2$ current for 12 hours.

When the particle size distribution of the toner was measured, it was found that the volume average particle size (D50) was 11.3 μm and the dispersion degree of the particle size was 1.43. When the molecular weight characteristics were determined, it was found that the weight average molecular weight (Mw) was 100,000.

The obtained toner was subjected to the heat resistance test, fixing test and copying test in the same manner as described in Example 15. At the heat resistance test, blocking was conspicuous and the toner was coagulated. At the fixing test, the lowest fixing temperature was 120° C. and the high-temperature offset-causing temperature was 150° C., and the fixing-possible temperature range was narrow and the offset resistance was poor. The image characteristics were tolerably good.

EXAMPLE 17

To 100 parts by weight of water containing 0.5% of tricalcium phosphate dispersed therein was added 100 parts by weight of styrene having 1% of AIBIN dissolved therein, and the polymerization was initiated at 70° C. in a separable flask with stirring at 250 rpm. The pH value of the dispersion medium at this point was 8. When the polymerization was conducted for about 2 hours and the polymerization ratio exceeded 60%, 50 parts by weight of a 4N aqueous solution of NaOH was added to adjust the pH value to 14, and the polymerization was further conducted for 6 hours to complete the polymerization. The formed polymerization product was washed with dilute hydrochloric acid and dried to obtain polystyrene beads having a particle size of about 2 mm. The weight average molecular weight (Mw) of the particles was 250,000 and the dispersion degree (Mw/Mn) was 14. A surface layer having a thickness of about 0.3 mm was stripped off from the beads by a knife, and the weight average molecular weights of the surface layer portion and central portion were measured. It was found that the weight average molecular weight of the surface layer portion was 50,000 and the weight average molecular weight of the central portion was 430,000.

COMPARATIVE EXAMPLE 8

To 400 parts by weight of water containing 0.5% of tricalcium phosphate dispersed therein was added 100 parts by weight of styrene having 1.2% of AIBN dissolved therein. The polymerization was carried out at 70° C. in a separable flask with stirring at 250 rpm for 8 hours. The pH value of the dispersion medium at this point was 11. After termination of the polymerization, the polymerization product was washed with dilute hydrochloric acid and dried to obtain polystyrene beads having a particle size of about 2 mm. The weight average molecular weight (Mw) of the beads was 250,000 and the dispersion degree (Mw/Mn) was 6.

When the molecular weights of the surface layer portion and central portion were measured in the same manner as described in Example 17. The molecular weight of the surface layer portion was 260,000 and the molecular weight of the central portion was 250,000, and there was no substantial difference.

With respect to each of the beads obtained in Example 17 and Comparative Example 7, the adhesion was tested in the following manner. Namely, 1.5 g of the beads were charged in a glass cylinder having an inner diameter of 10 mm and a length of 30 mm, and a pressure of 10 kg was applied and the beads were allowed to stand still at 90° C. in this state for 1 hour. When the beads of Examples 17 were taken out from the cylinder, it was found that the beads were coagulated in the form of a cylinder. However, in Comparative Example 7, the beads were not substantially changed. Accordingly, it was confirmed that the beads of Example 17 were excellent in the adhesion.

EXAMPLE 18

To 400 parts by weight of water containing 0.5% of tricalcium phosphate dispersed therein and having a pH 0.9% of AIBN dissolved therein, and the polymerization was initiated at 70° C. in a separable flask with stirring at 250 rpm. When about 2 hours passed and the polymerization ratio exceeded 60%, 200 ml of a 1N aqueous solution was gradually added to effect neutralization and adjust the pH value of the dispersion to 7. Then, the polymerization was further conducted for 6 hours to complete the polymerization. The polymerization product was washed with dilute hydrochloric acid and dried to obtain polystyrene beads having a particle size of about 2 mm. The weight average molecular weight (Mw) of the obtained beads was 250,000 and the dispersion degree (Mw/Mn) was 13. The surface layer portion having a thickness of 0.3 mm was stripped off from the beads by a knife, and the weight average molecular weights of the surface layer portion and the central portion were measured. It was found that the weight average molecular weight of the surface layer portion was 380,000 and the weight average molecular weight of the central portion was 100,000.

We claim:

1. A process for the preparation of an electrophotographic toner, which comprises the steps of
   (1) dissolving an acid- or alkali-soluble, hardly water-soluble inorganic dispersant in an acidic or alkaline aqueous medium,
   (2) adding a polymerizable monomer, a radical polymerization initiator and a toner additive to the aqueous medium and dispersing by stirring said monomer, initiator and additive into fine particulate oil drops having a narrow size distribution,
   (3) adding an alkali or acid to the aqueous medium while stirring, to neutralize the aqueous medium and thereby precipitate the hardly water-soluble inorganic dispersant onto the surface of the oil drops to stabilize said oil drops and
   (4) carrying out polymerization to form said electrophotographic toner while the fine oil drops are formed.

2. The preparation process according to claim 1, wherein the toner additive is a coloring agent or a magnetic powder.

3. The preparation process according to claim 1, wherein the hardly water-soluble inorganic dispersant is at least one member selected from the group consisting of tricalcium phosphate, calcium sulfate, magnesium carbonate, barium carbonate, calcium carbonate and aluminum hydroxide.

4. The preparation process according to claim 3, wherein the hardly water-soluble dispersant is tricalcium phosphate.

5. The preparation process according to claim 4, wherein the precipitation of the tricalcium phosphate is effected by addition of an alkali hydroxide.

6. The preparation process according to claim 4, wherein the polymerization is carried out at a pH value of at least 11.

7. The preparation process according to claim 1, wherein the polymerizable monomer is at least one member selected from the group consisting of vinyl aromatic monomers, acrylic monomers, vinyl ester monomers, vinyl ether monomers, di-olefin monomers and mono-olefin monomers.

8. The preparation process according to claim 1, wherein a surface active agent is used for suspending and dispersing the polymerizable monomer, the polymerization initiator and the toner additive.

9. The preparation process according to claim 8, wherein the surface active agent is a fatty acid type surface active agent or an alkyl sulfonate type surface active agent.

10. The process according to claim 1, wherein the toner has a narrow particle size distribution such that the proportion of particles having a particle size smaller than 5 μm is no more than about 4.2% and the proportion of particles having a particle size larger than 16 μm is no more than about 1.8%.

11. A process for the preparation of electrophotographic toner particles having a molecular weight reduced toward the interior from the surface layer portion, which comprises the steps of (1) carrying out polymerization in the state where a polymerizable monomer, a radical polymerization initiator, a toner additive and a hardly water-soluble inorganic dispersant, which acts as a dispersion stabilizer during oil drop formation are suspended and dispersed in an aqueous medium, (2) adding an acid to the reaction mixture when the polymerization degree reaches 20 to 80%, to reduce the pH value and thereby precipitate the dispersant onto the surface of the oil drops, thereby stabilizing said oil drops, and (3) continuing the suspension polymerization in this state to form said toner particles.

12. The preparation process according to claim 11, wherein the suspension polymerization is started at a pH value of at least 11.

13. The preparation process according to claim 11, wherein the hardly water-soluble inorganic dispersant is at least one member selected from the group consisting of tricalcium phosphate, calcium sulfate, magnesium carbonate, barium carbonate, calcium carbonate, aluminum hydroxide and silica.

14. The preparation process according to claim 11, wherein a surface active agent is used for suspending and dispersing the polymerizable monomer, the polymerization initiator, the toner additive and the hardly water-soluble inorganic dispersant.

15. The preparation process according to claim 14, wherein the surface active agent is a fatty acid type surface active agent or an alkyl sulfonate type surface active agent.

16. The preparation process according to claim 11, wherein the polymerizable monomer is at least one member selected from the group consisting of vinyl aromatic monomers, acrylic monomers, vinyl ester monomers, vinyl ether monomers, di-olefin monomers and mono-olefin monomers.

17. A process for the preparation of electrophotographic toner particles, which comprises the steps of (1) dissolving an acid- or alkali-soluble hardly water-soluble inorganic dispersant in an acidic or alkaline aqueous medium, (2) adding a polymerizable monomer, radical polymerization initiator and a toner additive in the aqueous medium and dispersing by stirring said monomer, initiator and additive into fine particulate oil drops having a narrow size distribution, (3) adding an acid or alkali to the aqueous medium while stirring, to neutralize the aqueous medium and thereby precipitate the hardly water-soluble inorganic dispersant onto the surface of the oil drops to stabilize said oil drops, (4) carrying out suspension polymerization while the fine oil drops are formed, (5) adding an acid to the reaction mixture to reduce the pH value when the polymerization degree reaches 20 to 80%, and thereby increase the degree of polymerization of the surface portion of the particles, and (6) continuing the polymerization in this state, wherein a polymer having a molecular weight gradient which is reduced at the interior and greater at the surface portion is formed.

18. The preparation process according to claim 17, wherein the hardly water-soluble inorganic dispersant is tricalcium phosphate.

19. The preparation process according to claim 17, wherein the pH value of the reaction mixture at the start of the polymerization is adjusted to a level of at least 11.

20. The preparation process according to claim 17, wherein the pH value of the reaction mixture is reduced to 7 to 10 when the polymerization degree reaches 20 to 80% and the polymerization is continued.

21. The preparation process according to claim 17, wherein a surface active agent is used for suspending and dispersing the polymerizable monomer, the radical polymerization initiator and the toner additive.

22. The preparation process according to claim 21, wherein the surface active agent is a fatty acid type surface active agent or an alkyl sulfonate type surface active agent.

23. The preparation process according to claim 17, wherein the polymerizable monomer is at least one member selected from the group consisting of vinyl aromatic monomers, acrylic monomers, vinyl ester monomers, vinyl ether monomers, di-olefin monomers and mono-olefin monomers.

24. The process according to claim 17, wherein the toner has a narrow particle size distribution such that the ratio D25/D75 of the 25% cumulative diameter (D25) based on the volume of the particles of the 75% cumulative diameter (D75) based on the volume of the particles is in the range of from 1.4 to 1.7.

* * * * *